(12) United States Patent
Kobayashi et al.

(10) Patent No.: US 12,240,476 B2
(45) Date of Patent: Mar. 4, 2025

(54) COMPUTER, VEHICLE, SERVER, MOBILE TERMINAL, AND VEHICLE MANAGEMENT METHOD

(71) Applicant: TOYOTA JIDOSHA KABUSHIKI KAISHA, Toyota (JP)

(72) Inventors: Ryosuke Kobayashi, Nagakute (JP); Tomokazu Maya, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 17/984,344

(22) Filed: Nov. 10, 2022

(65) Prior Publication Data
US 2023/0249699 A1    Aug. 10, 2023

(30) Foreign Application Priority Data

Feb. 10, 2022    (JP) ................. 2022-019533

(51) Int. Cl.
| | |
|---|---|
| *B60W 50/029* | (2012.01) |
| *B60K 35/00* | (2006.01) |
| *B60W 40/08* | (2012.01) |
| *B60W 50/02* | (2012.01) |
| *B60W 50/14* | (2020.01) |
| *B60K 35/28* | (2024.01) |

(52) U.S. Cl.
CPC .......... *B60W 50/029* (2013.01); *B60K 35/00* (2013.01); *B60W 40/08* (2013.01); *B60W 50/0205* (2013.01); *B60W 50/14* (2013.01); *B60K 35/28* (2024.01); *B60K 2360/161* (2024.01); *B60W 2050/146* (2013.01); *B60W 2540/043* (2020.02)

(58) Field of Classification Search
CPC .................................................. B60W 50/029
See application file for complete search history.

(56) References Cited

U.S. PATENT DOCUMENTS

| | | | |
|---|---|---|---|
| 10,054,947 B2 * | 8/2018 | Mays ................. | B60T 7/18 |
| 10,579,054 B2 * | 3/2020 | Zhao ................. | G05D 1/0027 |
| 11,507,107 B2 * | 11/2022 | Sakaguchi ......... | G01C 21/3822 |
| 2018/0052463 A1 | 2/2018 | Mays | |
| 2019/0073546 A1 | 3/2019 | Aoi et al. | |
| 2020/0209011 A1 | 7/2020 | Iwasaki et al. | |
| 2021/0245785 A1 | 8/2021 | Suzuki et al. | |
| 2022/0333941 A1 * | 10/2022 | Okubo ................ | G06Q 10/02 |
| 2023/0249699 A1 * | 8/2023 | Kobayashi ......... | B60K 35/00 701/29.2 |
| 2023/0249700 A1 * | 8/2023 | Kobayashi ........ | B60W 50/0205 701/29.2 |

FOREIGN PATENT DOCUMENTS

| | | |
|---|---|---|
| JP | 2019-046273 A | 3/2019 |
| JP | 2020-074169 A | 5/2020 |
| JP | 2021-123144 A | 8/2021 |

* cited by examiner

*Primary Examiner* — Michael A Berns
(74) *Attorney, Agent, or Firm* — Dinsmore & Shohl LLP

(57) ABSTRACT

A computer includes a diagnosis unit configured to, for a vehicle in which an abnormality has occurred and continuing traveling by autonomous driving is impossible, determine whether or not the vehicle is able to be restored on a spot and whether or not the vehicle is able to travel by manual driving. Such a computer may be mounted on a vehicle, a server, and a mobile terminal.

19 Claims, 10 Drawing Sheets

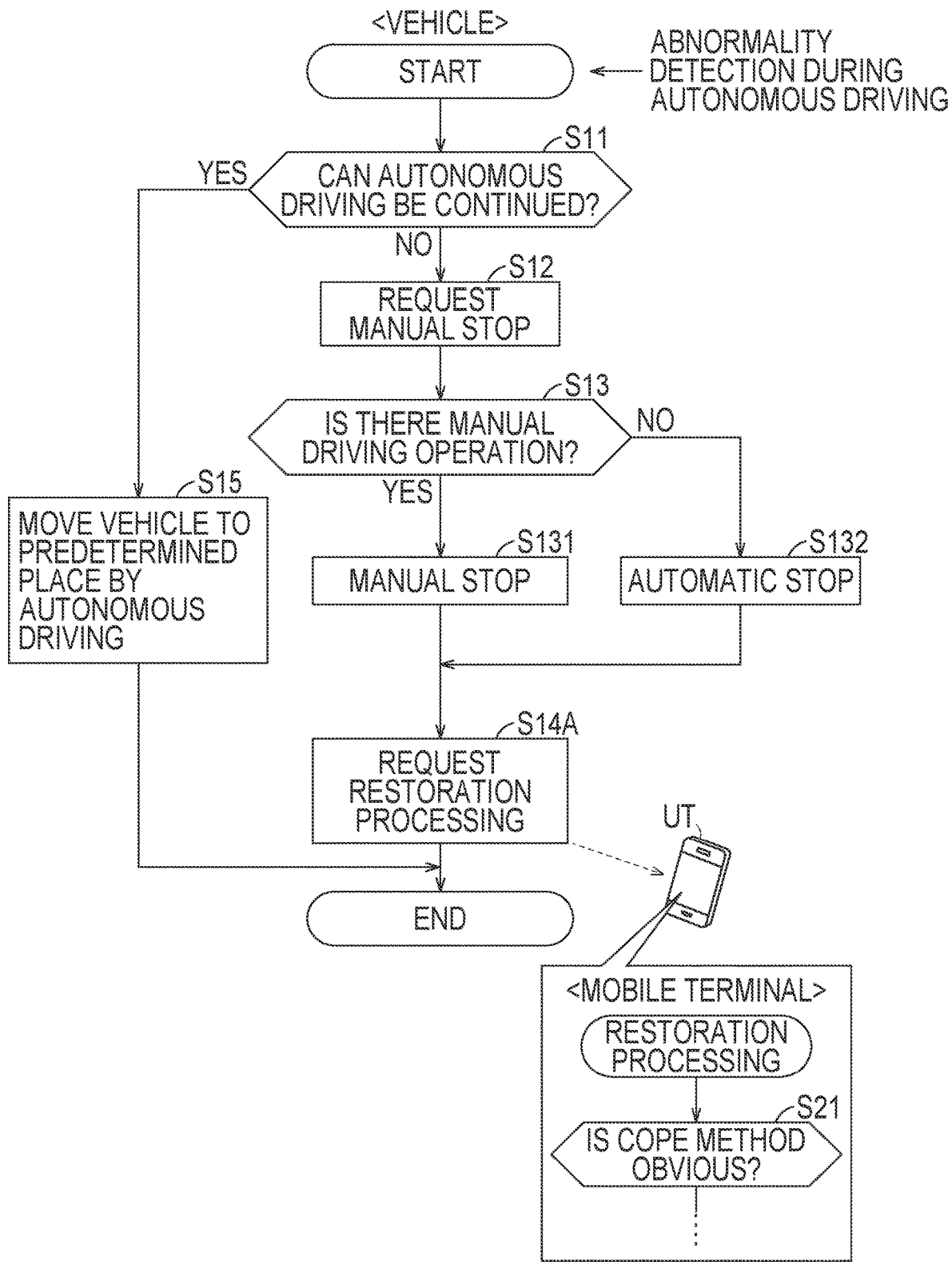

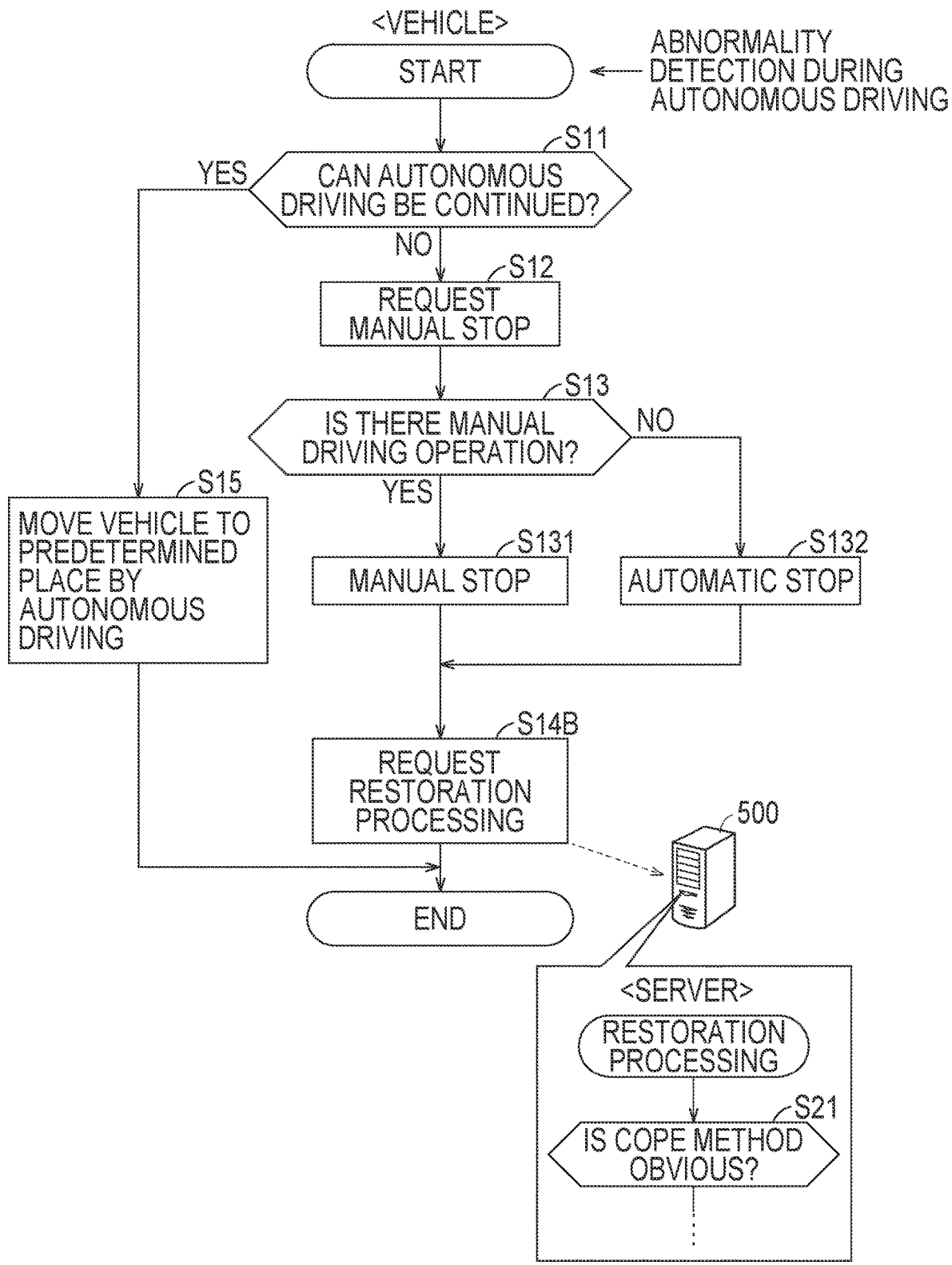

COMPUTER, VEHICLE, SERVER, MOBILE TERMINAL, AND VEHICLE MANAGEMENT METHOD

CROSS-REFERENCE TO RELATED APPLICATION

This application claims priority to Japanese Patent Application No. 2022-019533 filed on Feb. 10, 2022, incorporated herein by reference in its entirety.

BACKGROUND

1. Technical Field

The present disclosure relates to a computer, a vehicle, a server, a mobile terminal, and a vehicle management method.

2. Description of Related Art

Japanese Unexamined Patent Application Publication No. 2020-074169 (JP 2020-074169 A) discloses a vehicle system that allocates an autonomous driving vehicle.

SUMMARY

In future, it is considered that, as an autonomous driving technique is improved, the number of cases in which a user who is unfamiliar with driving (user who does not have a driving skill) or a user who does not know a lot about a car uses an autonomous driving vehicle that travels without the presence of a manager as transportation technique will be increased. In a case where an abnormality has occurred in the vehicle and traveling by autonomous driving cannot be continued when such a user uses the autonomous driving vehicle, there is the probability that the user cannot cope with that case by himself/herself and is at a loss. Even in a case where the user can request help from a support center via a mobile phone, there is the probability that the user cannot explain a situation accurately, and it takes a time for the user to be rescued.

The present disclosure is to provide a computer, a vehicle, a server, a mobile terminal, and a vehicle management method capable of taking measures with respect to a vehicle at an early stage and in an appropriate manner in a case where an abnormality has occurred in a vehicle during autonomous driving.

A first aspect of the present disclosure relates to a computer including a diagnosis unit and a cope unit. The diagnosis unit is configured to, for a vehicle in which an abnormality has occurred and continuing traveling by autonomous driving is impossible, determine whether or not the vehicle is able to be restored on a spot and whether or not the vehicle is able to travel by manual driving. The cope unit is configured to execute predetermined processing in accordance with a determination result of the diagnosis unit.

The computer automatically determines a status of the vehicle. Moreover, the predetermined processing is executed in accordance with the determination result. Therefore, even in a case where the abnormality has occurred in the vehicle used by the user who is unfamiliar with driving (user who does not have the driving skill) or the user who does not know a lot about the car, it is possible to take measures with respect to the vehicle at an early stage and in an appropriate manner.

The cope unit may be configured to execute a tow truck arrangement for towing the vehicle in a case where the diagnosis unit determines that the vehicle is unable to be restored on the spot and the vehicle is unable to travel by manual driving. The cope unit may be configured not to execute the tow truck arrangement in each of a case where the diagnosis unit determines that the vehicle is able to be restored on the spot and a case where the diagnosis unit determines that the vehicle is able to travel by manual driving.

The computer automatically determines whether or not towing is needed. Since the tow truck arrangement is automatically executed, even in a case where the abnormality has occurred in the vehicle used by the user who is unfamiliar with driving or the user who does not know a lot about the car, it is possible to execute the tow truck arrangement at an early stage and in an appropriate manner. In addition, in a case where a determination is made that towing is not needed, the tow truck arrangement is not executed, so that an increase in a cost due to an unneeded tow truck arrangement is suppressed.

The cope unit may be configured to display a manual indicating a restoration procedure on at least one of a terminal mounted on the vehicle and a terminal of a user who is using the vehicle in a case where the diagnosis unit determines that the vehicle is able to be restored on the spot.

With the configuration described above, it is easier for the user to complete restoration work in a short time by the user proceeding with the restoration work in accordance with the manual. The terminal mounted on the vehicle may be a car navigation system. The terminal of the user who is using the vehicle may be a mobile terminal (for example, a smartphone or a wearable device).

In the computer described above, the diagnosis unit may be configured to withdraw the determination that the vehicle in which the abnormality has occurred is able to be restored on the spot and determine that the vehicle in which the abnormality has occurred is unable to be restored on the spot in a case where the user makes input indicating work stop to the terminal on which the manual is displayed.

With the configuration described above, it is easier to accurately determine whether or not the autonomous driving vehicle can be restored on the spot for the abnormality that has occurred in the autonomous driving vehicle. Specifically, in a case where the computer makes an erroneous determination, it is possible to give priority to a determination of the user and correct the erroneous determination.

The diagnosis unit may be configured to determine whether or not a cope method of the abnormality is obvious and whether or not the vehicle in which the abnormality has occurred is able to be restored within a predetermined time. The diagnosis unit may be configured to determine that the vehicle in which the abnormality has occurred is able to be restored on the spot in a case where the cope method of the abnormality is obvious and the vehicle in which the abnormality has occurred is able to be restored within the predetermined time.

With the configuration described above, it is easier to accurately determine whether or not the autonomous driving vehicle in which the abnormality has occurred can be restored on the spot.

In the computer described above, the diagnosis unit may be configured to determine whether or not the vehicle in which the abnormality has occurred is able to be restored within the predetermined time by using user information of a user who is using the vehicle.

With the configuration described above, it is easier to accurately determine whether or not the autonomous driving vehicle in which the abnormality has occurred can be restored within the predetermined time by using the user information of the user who is using the vehicle.

The diagnosis unit may be configured to determine whether or not the vehicle is able to be switched to manual driving and whether or not a person who is able to manually drive the vehicle is in the vehicle. The diagnosis unit may be configured to determine that the vehicle is able to travel by manual driving in a case where the vehicle is able to be switched to manual driving and the person who is able to manually drive the vehicle is in the vehicle.

With the configuration described above, it is easier to accurately determine whether or not the autonomous driving vehicle in which the abnormality has occurred can travel by manual driving. The diagnosis unit may determine that the vehicle is able to be switched to manual driving in a case where the abnormality that has occurred in the vehicle does not hinder manual driving.

The diagnosis unit may be configured to determine whether or not the person who is able to manually drive the vehicle is in the vehicle by using output of a sensor configured to detect whether or not a person is present in the vehicle and user information of a user who is using the vehicle. With such a configuration, it is easier to accurately determine whether or not the person who can manually drive the vehicle is in the vehicle.

The cope unit may be configured to execute driving assistance processing in a case where the vehicle in which the abnormality has occurred and continuing traveling by autonomous driving is impossible is able to travel by manual driving. With such a configuration, it is easier for the vehicle to travel appropriately by manual driving. The driving assistance processing may be displaying a destination, or may be driving assistance by an advanced driving assistance system (ADAS).

A second aspect of the present disclosure relates to a vehicle including a control device. The vehicle further includes an autonomous driving kit, and a vehicle control interface configured to mediate exchange of signals between the control device and the autonomous driving kit. The autonomous driving kit is configured to transmit a command for autonomous driving to the control device via the vehicle control interface. The control device is configured to control the vehicle in accordance with the command from the autonomous driving kit. The control device is configured to transmit a signal indicating a state of the vehicle to the autonomous driving kit via the vehicle control interface. Moreover, the control device or the autonomous driving kit includes any of the computers described above.

Since the vehicle includes the computer described above, in a case in which the abnormality has occurred in the vehicle during autonomous driving, it is possible to take measures with respect to the vehicle at an early stage and in an appropriate manner.

A third aspect of the present disclosure relates to a server including any of the computers described above.

Since the server includes the computer described above, in a case in which the abnormality has occurred in the vehicle during autonomous driving, it is possible to take measures with respect to the vehicle at an early stage and in an appropriate manner.

A fourth aspect of the present disclosure relates to a mobile terminal including any of the computers described above.

Since the mobile terminal includes the computer described above, in a case in which the abnormality has occurred in the vehicle during autonomous driving, it is possible to take measures with respect to the vehicle at an early stage and in an appropriate manner.

A fifth aspect of the present disclosure relates to a vehicle management method including a first determination, a second determination, a third determination, and a tow truck arrangement.

In the first determination, a computer determines whether or not an abnormality has occurred in a vehicle during autonomous driving, the abnormality disabling the vehicle from continuing traveling by autonomous driving. In the second determination, the computer determines whether or not the vehicle in which the abnormality has occurred is able to be restored on a spot. In the third determination, the computer determines whether or not the vehicle in which the abnormality has occurred is able to travel by manual driving. In the tow truck arrangement, the computer executes a tow truck arrangement for towing the vehicle in a case where the vehicle in which the abnormality has occurred is unable to be restored on the spot and the vehicle in which the abnormality has occurred is unable to travel by manual driving.

With the vehicle management method described above, as with the computer described above, in a case in which the abnormality has occurred in the vehicle during autonomous driving, it is possible to take measures with respect to the vehicle at an early stage and in an appropriate manner.

According to the present disclosure, in a case in which the abnormality has occurred in the vehicle during autonomous driving, it is possible to take measures with respect to the vehicle at an early stage and in an appropriate manner.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart showing a first modification example of the processing shown in FIG. 5; and FIG. 10 is a flowchart showing a second modification example of the processing shown in FIG. 5.

DETAILED DESCRIPTION OF EMBODIMENTS

Figure 1:
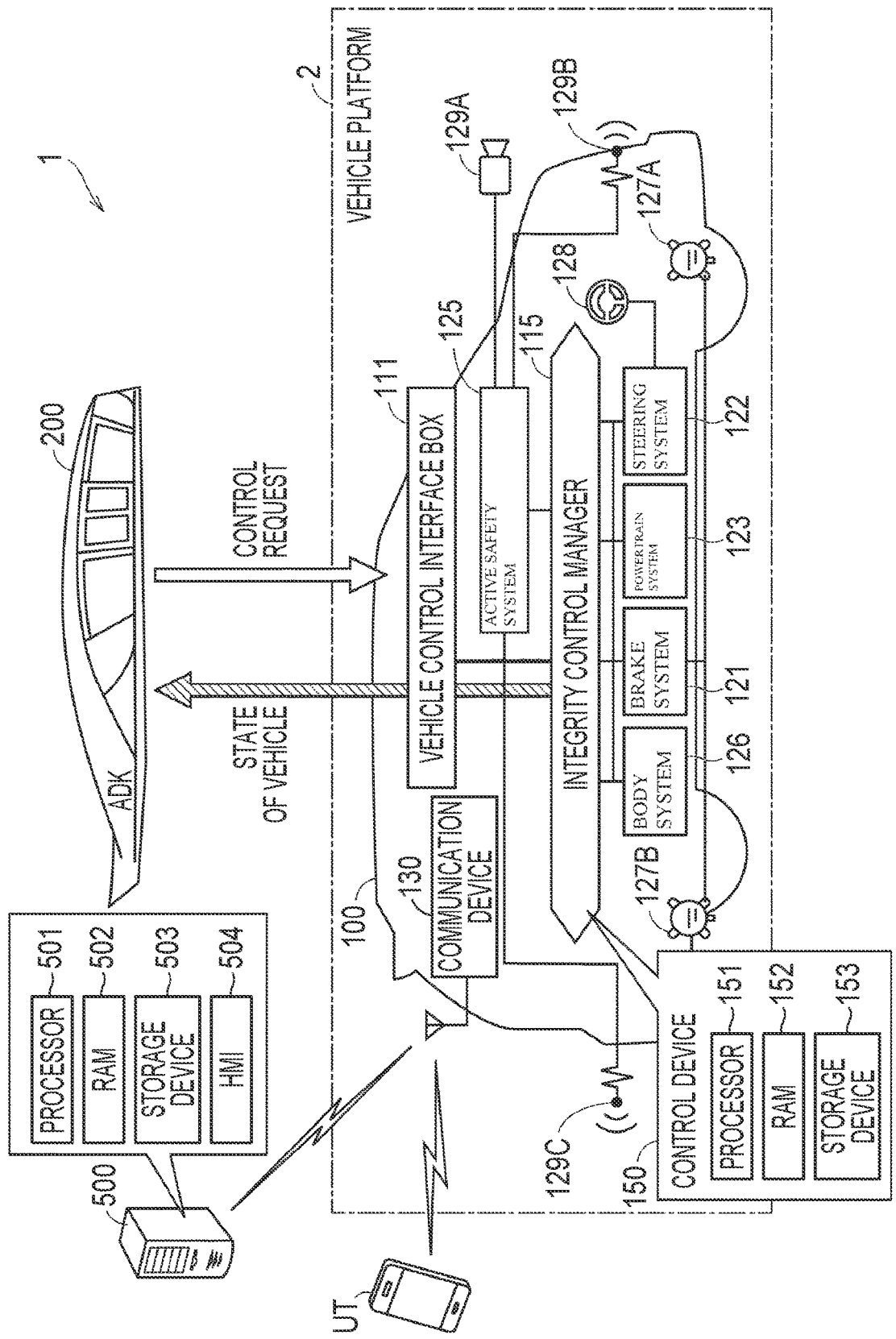
FIG. 1 is a diagram showing a schematic configuration of a vehicle according to an embodiment of the present disclosure.

In the following, an embodiment of the present disclosure will be described in detail with reference to the drawings. It should be noted that, in the drawings, the same or corresponding parts are designated by the same reference signs and the description thereof will not be repeated.

FIG. 1 is a diagram showing a schematic configuration of a vehicle according to the embodiment of the present disclosure. With reference to FIG. 1, a vehicle 1 includes an autonomous driving kit (hereinafter, referred to as "ADK") 200 and a vehicle platform (hereinafter, referred to as "VP") 2.

The VP 2 includes a control system of a base vehicle 100 and a vehicle control interface box (hereinafter, referred to as "VCIB") 111 provided in the base vehicle 100. The VCIB 111 may communicate with the ADK 200 via an in-vehicle network, such as a controller area network (CAN). It should be noted that, although the base vehicle 100 and the ADK 200 are shown at separate positions in FIG. 1, the ADK 200 is actually attached to the base vehicle 100. In the present embodiment, the ADK 200 is attached to a rooftop of the base vehicle 100. It should be noted that an attachment position of the ADK 200 can be changed as appropriate.

The base vehicle 100 is, for example, a commercially available electrified vehicle (xEV). The xEV is a vehicle that uses electric power as all or part of a power source. In the present embodiment, a battery electric vehicle (BEV) is adopted as the base vehicle 100. It should be noted that the present disclosure is not limited to this, and the base vehicle 100 may be an xEV (HEV, PHEV, FCEV, or the like) other than the BEV. The number of wheels provided in the base vehicle 100 is, for example, four. It should be noted that the number of wheels provided in the base vehicle 100 is not limited to this, and may be three or five or more.

The control system of the base vehicle 100 includes, in addition to an integrity control manager 115, various systems and various sensors for controlling the base vehicle 100. The integrity control manager 115 controls various systems related to the operation of the base vehicle 100 in an integrated manner based on signals (sensor detection signals) from various sensors provided in the base vehicle 100.

In the present embodiment, the integrity control manager 115 includes a control device 150. The control device 150 includes a processor 151, a random access memory (RAM) 152, and a storage device 153. As the processor 151, for example, a central processing unit (CPU) can be adopted. The RAM 152 functions as a working memory that transitorily stores the data processed by the processor 151. The storage device 153 is configured to store the stored information. For example, the storage device 153 includes a read only memory (ROM) and a rewritable non-volatile memory. The storage device 153 stores information used in a program (for example, a map, a mathematical formula, and various parameters), in addition to the program. In the present embodiment, the processor 151 executes the program stored in the storage device 153 to execute various vehicle controls (for example, autonomous driving control in response to an instruction from the ADK 200). It should be noted that these pieces of processing may be executed by dedicated hardware (electronic circuit) instead of software. It should be noted that the number of processors provided in the control device 150 is optional, and the processor may be prepared for each predetermined control.

The base vehicle 100 includes a brake system 121, a steering system 122, a powertrain system 123, an active safety system 125, and a body system 126. These systems are controlled in an integrated manner by the integrity control manager 115. In the present embodiment, each system includes the computer. Moreover, the computer for each system communicates with the integrity control manager 115 via the in-vehicle network (for example, the CAN). In the following, the computer provided in each system is referred to as an "electronic control unit (ECU)".

The brake system 121 includes a braking device provided in each wheel of the base vehicle 100, and an ECU that controls the braking device. In the present embodiment, a hydraulic disc brake device is adopted as the braking device. The base vehicle 100 includes wheel speed sensors 127A, 127B. The wheel speed sensors 127A are provided in front wheels of the base vehicle 100 and detect the rotation speed of the front wheels. The wheel speed sensors 127B are provided in rear wheels of the base vehicle 100 and detect the rotation speed of the rear wheels. The ECU of the brake system 121 outputs a rotation direction and the rotation speed of each wheel detected by the wheel speed sensors 127A, 127B to the integrity control manager 115.

The steering system 122 includes a steering device of the base vehicle 100, and an ECU that controls the steering device. The steering device includes, for example, a rack and pinion type electric power steering (EPS) in which a steering angle can be adjusted by an actuator. The base vehicle 100 includes a pinion angle sensor 128. The pinion angle sensor 128 detects a rotation angle (pinion angle) of a pinion gear coupled to a rotation shaft of the actuator constituting the steering device. The ECU of the steering system 122 outputs the pinion angle detected by the pinion angle sensor 128 to the integrity control manager 115.

The powertrain system 123 includes an electric parking brake (EPB) provided in at least one of the wheels provided in the base vehicle 100, a P-Lock device provided in a transmission of the base vehicle 100, a shift device configured to select a shift range, a drive source of the base vehicle 100, and an ECU that controls each device provided in the powertrain system 123. The EPB is provided separately from the braking device described above, and puts the wheels into a fixed state by an electric actuator. For example, the P-Lock device puts a rotation position of an output shaft of the transmission into the fixed state by a parking lock pawl that can be driven by the actuator. Although details will be described below, in the present embodiment, a motor that receives electric power supplied from a battery is adopted as the drive source of the base vehicle 100. The ECU of the powertrain system 123 outputs, to the integrity control manager 115, the presence or absence of fixation by each of the EPB and the P-Lock device, the shift range selected by the shift device, and a state of each of the battery and the motor (see FIG. 4 described below).

The active safety system 125 includes an ECU that determines the probability of collision with respect to the traveling vehicle 1. The base vehicle 100 includes a camera 129A and radar sensors 129B, 129C that detect peripheral situations including the front and rear of the vehicle 1. The ECU of the active safety system 125 determines whether or not there is the probability of collision by using the signals received from the camera 129A and the radar sensors 129B, 129C. In a case where the active safety system 125 determines that there is the probability of collision, the integrity control manager 115 outputs a braking command to the brake system 121 to increase a braking force of the vehicle 1. The base vehicle 100 according to the present embodiment includes the active safety system 125 from an initial stage (at the time of shipment). However, the present disclosure is not limited to this, and an active safety system that can be retrofitted to the base vehicle may be adopted.

The body system 126 includes body system components (for example, turn signals, a horn, and a windshield wiper), and an ECU that controls the body system components. The ECU of the body system 126 controls the body system components in response to a user operation in a manual mode, controls the body system components in response to the command received from the ADK 200 via the VCIB 111 and the integrity control manager 115 in an autonomous mode.

The vehicle 1 is configured to execute autonomous driving. The VCIB 111 functions as a vehicle control interface. In a case where the vehicle 1 travels by autonomous driving, the integrity control manager 115 and the ADK 200 exchange signals with each other via the VCIB 111, and the integrity control manager 115 executes traveling control (that is, autonomous driving control) by the autonomous mode in response to the command from the ADK 200. It should be noted that the ADK 200 can also be removed from the base vehicle 100. The base vehicle 100 can travel as a single base vehicle 100 by the user's driving even in a state in which the ADK 200 is removed. In a case where the base vehicle 100 travels as a single base vehicle 100, the control system of the base vehicle 100 executes the traveling control in the manual mode (that is, traveling control in response to the user operation).

In the present embodiment, the ADK 200 exchanges signals with the VCIB 111 in accordance with an application program interface (API) that defines each signal to be communicated. The ADK 200 is configured to process various signals defined by the API described above. For example, the ADK 200 creates a traveling plan of the vehicle 1 and outputs various commands requesting control to cause the vehicle 1 to travel in accordance with the created traveling plan to the VCIB 111 in accordance with the API described above. In the following, each of the various commands described above output from the ADK 200 to the VCIB 111 is also referred to as an "API command". In addition, the ADK 200 receives various signals indicating a state of the base vehicle 100 from the VCIB 111 in accordance with the API, and reflects the received state of the base vehicle 100 in the creation of the traveling plan. In the following, each of the various signals received by the ADK 200 from the VCIB 111 is also referred to as an "API signal". Both the API command and the API signal correspond to the signals defined in the API described above. Details of the configuration of the ADK 200 will be described below (see FIG. 2).

The VCIB 111 receives various API commands from the ADK 200. In a case where the API command is received from the ADK 200, the VCIB 111 converts the API command into a signal format that can be processed by the integrity control manager 115. In the following, the API command converted into the signal format that can be processed by the integrity control manager 115 is also referred to as "control command". In a case where the API command is received from the ADK 200, the VCIB 111 outputs the control command corresponding to the API command to the integrity control manager 115.

The control device 150 of the integrity control manager 115 transmits various signals (for example, a sensor signal or a status signal) indicating the state of the base vehicle 100 detected in the control system of the base vehicle 100 to the ADK 200 via the VCIB 111. The VCIB 111 sequentially receives the signals indicating the state of the base vehicle 100 from the integrity control manager 115. The VCIB 111 decides a value of the API signal based on the signals received from the integrity control manager 115. In addition, the VCIB 111 also converts the signal received from the integrity control manager 115 into an API signal format, as needed. Moreover, the VCIB 111 outputs the obtained API signal to the ADK 200. The API signal indicating the state of the base vehicle 100 is sequentially output from the VCIB 111 to the ADK 200 in real time.

In the present embodiment, a less versatile signal defined by, for example, an automobile manufacturer is exchanged between the integrity control manager 115 and the VCIB 111, and a more versatile signal (for example, a signal defined by an open API) is exchanged between the ADK 200 and the VCIB 111. The VCIB 111 converts the signals between the ADK 200 and the integrity control manager 115 to allow the integrity control manager 115 to execute the vehicle control in response to the command from the ADK 200. It should be noted that the function of the VCIB 111 is not limited to the function of converting the signals described above. For example, the VCIB 111 may make a predetermined determination and transmit signals based on the determination result (for example, signals for notification, instruction, and request) to at least one of the integrity control manager 115 and the ADK 200. Details of the configuration of the VCIB 111 will be described below (see FIG. 2).

The base vehicle 100 further includes a communication device 130. The communication device 130 includes various communication interfaces (I/Fs). The control device 150 is configured to execute communication with an external device of the vehicle 1 (for example, a mobile terminal UT and a server 500 described below) via the communication device 130. The communication device 130 includes a wireless communicator (for example, a data communication module (DCM)) that can access a mobile communication network (telematics). The communication device 130 communicates with the server 500 via the mobile communication network. The wireless communicator may include a communication I/F compatible with fifth-generation mobile communication system (5G). In addition, the communication device 130 includes a communication I/F for directly communicating with the mobile terminal UT present in the vehicle or in a range around the vehicle. The communication device 130 and the mobile terminal UT may execute short-range communication, such as wireless local area network (LAN), near field communication (NFC), or Bluetooth (registered trademark).

The mobile terminal UT is a terminal carried by the user who uses the vehicle 1. In the present embodiment, a smartphone equipped with a touch panel display is adopted as the mobile terminal UT. It should be noted that the present disclosure is not limited to this, any mobile terminal can be adopted as the mobile terminal UT, and a laptop, a tablet terminal, a wearable device (for example, a smartwatch or smart glasses), an electronic key, or the like can also be adopted.

The vehicle 1 can be adopted as one of the components of a mobility-as-a-service (MaaS) system. The MaaS system includes, for example, a mobility service platform (MSPF). The MSPF is a unified platform to which various mobility services (for example, various mobility services provided by a ride sharing business operator, a car sharing business operator, an insurance company, a car rental business operator, a taxi business operator, and the like) are connected. The server 500 is a computer that manages and opens information for the mobility services in the MSPF. The server 500 manages various types of mobility information, and provides information (for example, the API and information on cooperation between mobility) in response to a request from the business operator. The business operator that provides the service can use various functions provided by the MSPF by using the API open on the MSPF. For example, the API needed for the development of the ADK is open on the MSPF.

The server 500 includes a processor 501, a RAM 502, a storage device 503, and a human machine interface (HMI) 504. The storage device 503 is configured to store the stored information. The storage device 503 stores information used in a program (for example, a map, a mathematical formula, and various parameters), in addition to the program. A human machine interface (HMI) 504 includes an input device and a display device. The HMI 504 may be a touch panel display. The HMI 504 may include a smart speaker that receives a voice input.

Figure 2:
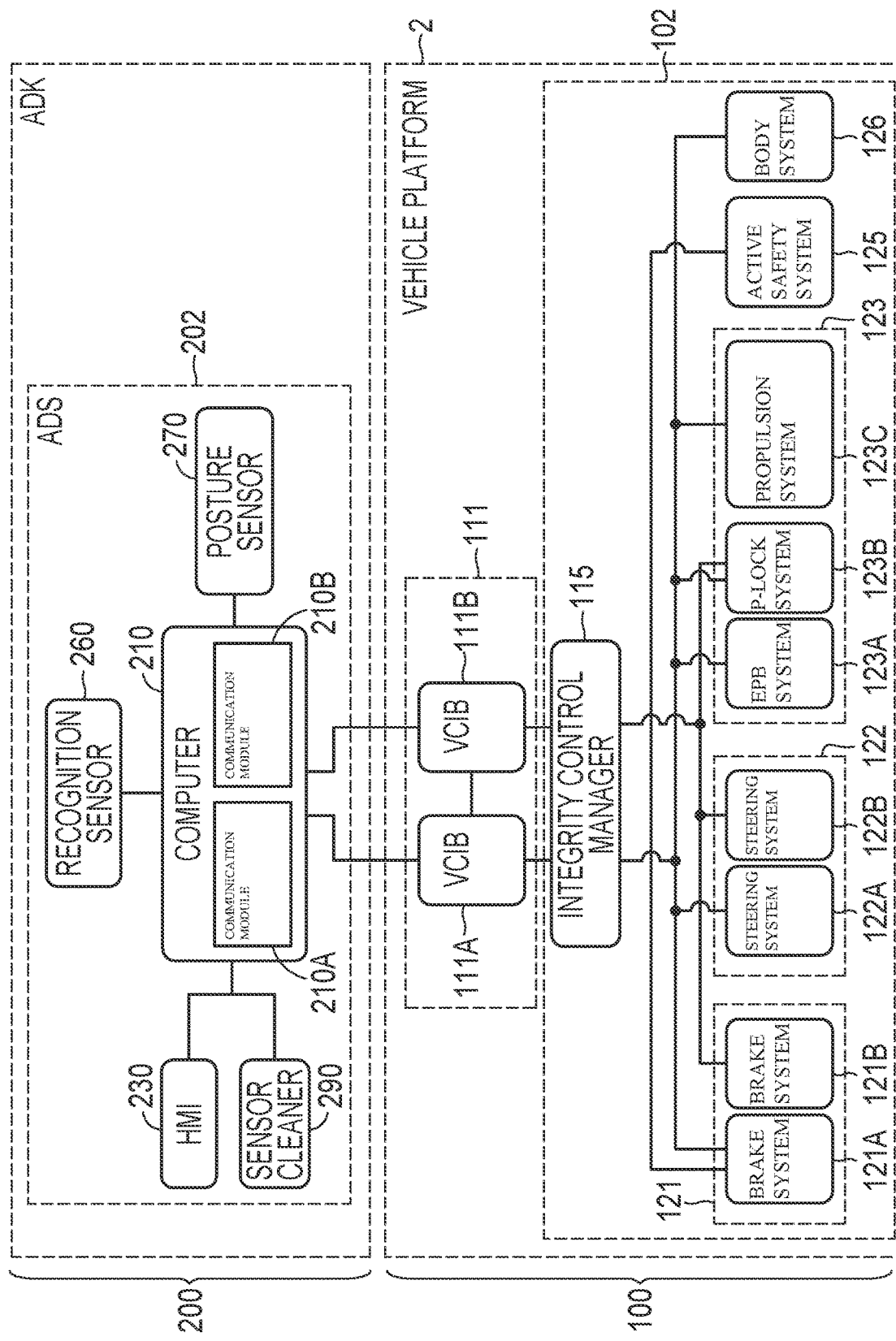
FIG. 2 is a diagram showing details of a control system of the vehicle shown in FIG. 1.

FIG. 2 is a diagram showing details of the control system of the vehicle 1. With reference to FIG. 2 together with FIG. 1, the ADK 200 includes an autonomous driving system (hereinafter, referred to as "ADS") 202 for executing autonomous driving of the vehicle 1. The ADS 202 includes a computer 210, a human machine interface (HMI) 230, a recognition sensor 260, a posture sensor 270, and a sensor cleaner 290.

The computer 210 includes a processor and a storage device that stores autonomous driving software using the API, and is configured to execute the autonomous driving software by the processor. The autonomous driving software executes control related to autonomous driving (see FIG. 3 described below). The autonomous driving software may be updated sequentially by over the air (OTA). The computer 210 further includes communication modules 210A, 210B.

The HMI 230 is a device for exchanging information between the user and the computer 210. The HMI 230 includes an input device and a notification device. Through the HMI 230, the user can make an instruction or a request to the computer 210 or change a value of a parameter used in the autonomous driving software (it should be noted that the change is limited to a parameter that is allowed to be changed). The HMI 230 may be a touch panel display having both functions of the input device and the notification device.

The recognition sensor 260 includes various sensors that acquire information for recognizing an external environment of the vehicle 1 (hereinafter, also referred to as "environmental information"). The recognition sensor 260 acquires the environmental information of the vehicle 1 and outputs the acquired environmental information to the computer 210. The environmental information is used for the autonomous driving control. In the present embodiment, the recognition sensor 260 includes a camera that images the surroundings (including the front and rear) of the vehicle 1 and an obstacle detector (for example, a millimeter wave radar and/or a LiDAR) that detects an obstacle by electromagnetic waves or sound waves. For example, the computer 210 can recognize a person present in a range that can be recognized by the vehicle 1, an object (other vehicles, a pillar, a guardrail, or the like), and a line on a road (for example, a center line) by using the environmental information received from the recognition sensor 260. Artificial intelligence (AI) or an image processing processor may be used for recognition.

The posture sensor 270 acquires information related to a posture of the vehicle 1 (hereinafter, also referred to as "posture information") and outputs the acquired information to the computer 210. The posture sensor 270 includes various sensors that detect the acceleration, the angular velocity, and the position of the vehicle 1. In the present embodiment, the posture sensor 270 includes an inertial measurement unit (IMU) and a global positioning system (GPS) sensor. The IMU detects the acceleration of each of a front-rear direction, a right-left direction, and an up-down direction of the vehicle 1, and the angular velocity of each of a roll direction, a pitch direction, and a yaw direction of the vehicle 1. The GPS sensor detects the position of the vehicle 1 by using signals received from a plurality of GPS satellites. A technique of measuring the posture with high accuracy by combining the IMU and the GPS is known in a field of an automobile and an aircraft. The computer 210 may measure the posture of the vehicle 1 from the posture information described above by using, for example, such a known technique.

The sensor cleaner 290 is a device that removes dirt from the sensor (for example, the recognition sensor 260) that is exposed to the outside air outside the vehicle. For example, the sensor cleaner 290 may be configured to use a cleaning solution and the windshield wiper to clean a lens of the camera and an exit of the obstacle detector.

In the vehicle 1, in order to improve the safety, predetermined functions (for example, braking, steering, and vehicle fixing) are provided with redundancy. A control system 102 of the base vehicle 100 includes a plurality of systems that realizes equivalent functions. Specifically, the brake system 121 includes brake systems 121A, 121B. The steering system 122 includes steering systems 122A, 122B. The powertrain system 123 includes an EPB system 123A and a P-Lock system 123B. Each system includes an ECU. Even in a case where the abnormality occurs in one of the systems that realize the equivalent functions, the other of the systems is operated normally, so that the function works normally in the vehicle 1.

The VCIB 111 includes a VCIB 111A and a VCIB 111B. Each of the VCIBs 111A, 111B includes a computer. The communication modules 210A, 210B of the computer 210 are configured to communicate with the computers of the VCIBs 111A, 111B, respectively. The VCIB 111A and the VCIB 111B are connected to each other to be communicable with each other. Each of the VCIBs 111A, 111B can be operated independently, and even in a case where the abnormality occurs in one of the VCIBs 111A, 111B, the other of the VCIBs 111A, 111B is operated normally, so that the VCIB 111 is operated normally. Both the VCIBs 111A, 111B are connected to each of the systems described above via the integrity control manager 115. It should be noted that, as shown in FIG. 2, connection destinations of the VCIB 111A and the VCIB 111B are partially different.

In the present embodiment, a function of accelerating the vehicle 1 is not provided with redundancy. The powertrain system 123 includes a propulsion system 123C as a system for accelerating the vehicle 1.

The vehicle 1 is configured to switch between the autonomous mode and the manual mode. The API signal received by the ADK 200 from the VCIB 111 includes a signal indicating whether the vehicle 1 is in the autonomous mode or the manual mode (hereinafter, referred to as "autonomous state"). The user can select any of the autonomous mode and the manual mode through a predetermined input device (for example, the HMI 230 or the mobile terminal UT). In a case where any of the driving modes is selected by the user, the vehicle 1 is set to the selected driving mode, and the selection result is reflected in the autonomous state. It should be noted that, in a case where the vehicle 1 is not in a state in which autonomous driving can be executed, the driving mode does not shift to the autonomous mode even when the user selects the autonomous mode. Switching of the driving modes of the vehicle 1 may be executed by the integrity control manager 115. The integrity control manager 115 may switch between the autonomous mode and the manual mode in accordance with a status of the vehicle 1.

In a case where the vehicle 1 is in the autonomous mode, the computer 210 acquires a state of the vehicle 1 from the VP 2 and sets a next operation of the vehicle 1 (for example, acceleration, deceleration, and turning). Moreover, the computer 210 outputs various commands for realizing the next set operation of the vehicle 1. In a case where the computer 210 executes the API software (that is, the autonomous driving software using the API), the command related to the autonomous driving control is transmitted from the ADK 200 to the integrity control manager 115 through the VCIB 111.

Figure 3:
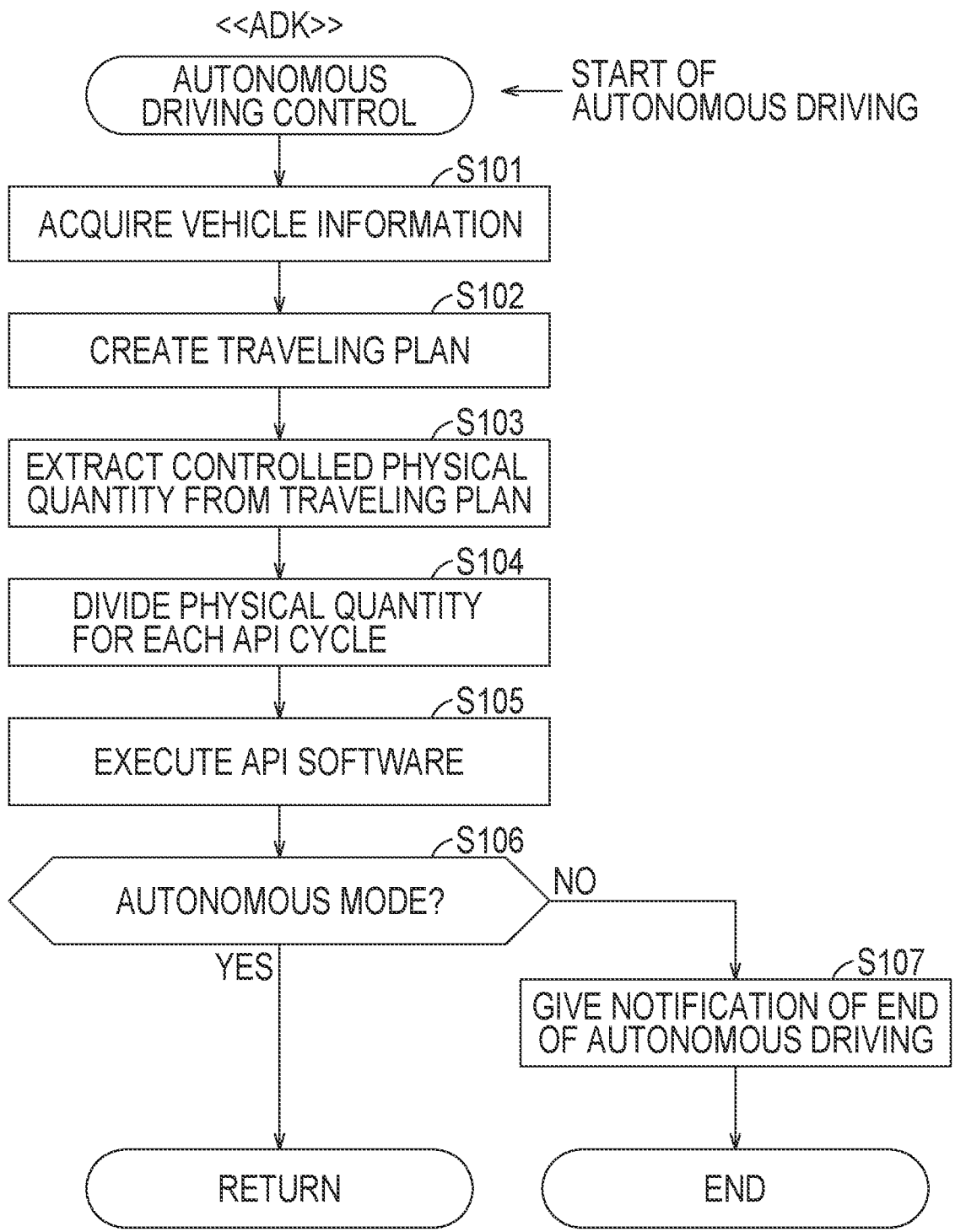
FIG. 3 is a flowchart showing a processing procedure of autonomous driving control according to the embodiment of the present disclosure.

FIG. 3 is a flowchart showing processing executed by the ADK 200 in the autonomous driving control according to the present embodiment. The processing shown in this flowchart is repeatedly executed in a cycle corresponding to the API (API cycle) in a case where the vehicle 1 is in the autonomous mode. In a case where the driving mode of the vehicle 1 is switched from the manual mode to the autonomous mode, after a start signal indicating the start of autonomous driving is transmitted from the vehicle 1 (communication device 130) to the server 500 together with the identification information of the vehicle 1, a series of processing shown in FIG. 3 described below is started. In the following, each step in the flowchart is simply referred to as "S".

With reference to FIG. 3 together with FIGS. 1 and 2, in S101, the computer 210 acquires the current information of the vehicle 1. For example, the computer 210 acquires the environmental information and the posture information of the vehicle 1 from the recognition sensor 260 and the posture sensor 270. Further, the computer 210 acquires the API signal. In the present embodiment, the API signal indicating the state of the vehicle 1 is sequentially output from the VCIB 111 to the ADK 200 in real time regardless of whether the vehicle 1 is in any of the autonomous mode and the manual mode. In order to improve the accuracy of the autonomous driving control, the state of the vehicle 1 may be sequentially transmitted from the integrity control manager 115 to the ADK 200 in a shorter cycle in the autonomous mode than in the manual mode. The API signal acquired by the computer 210 includes, in addition to the autonomous state described above, signals indicating the rotation direction and the rotation speed of each wheel detected by the wheel speed sensors 127A, 127B.

In S102, the computer 210 creates the traveling plan based on the information of the vehicle 1 acquired in S101. For example, the computer 210 calculates the behavior of the vehicle 1 (for example, the posture of the vehicle 1) and creates the traveling plan suitable for the state of the vehicle 1 and the external environment. The traveling plan is data indicating the behavior of the vehicle 1 within a predetermined period. In a case where the traveling plan is already present, the traveling plan may be amended in S102.

In S103, the computer 210 extracts a controlled physical quantity (acceleration, tire turning angle, or the like) from the traveling plan created in S102. In S104, the computer 210 divides the physical quantity extracted in S103 for each API cycle. In S105, the computer 210 executes the API software by using the physical quantity divided in S104. By executing the API software in this way, the API command (propulsion direction command, propulsion command, braking command, vehicle fixing command, or the like) requesting control to realize the physical quantity in accordance with the traveling plan is transmitted from the ADK 200 to the VCIB 111. The VCIB 111 transmits the control command corresponding to the received API command to the integrity control manager 115, and the integrity control manager 115 executes the autonomous driving control of the vehicle 1 in response to the control command.

In following S106, the computer 210 determines whether or not the vehicle 1 is in the autonomous mode. While the autonomous mode is maintained (YES in S106), autonomous driving of the vehicle 1 is executed by repeatedly executing the processing of S101 to S105. On the other hand, in a case where the vehicle 1 is in the manual mode (NO in S106), in S107, an end signal indicating the end of autonomous driving is transmitted from the vehicle 1 (communication device 130) to the server 500 together with the identification information of the vehicle 1, and then the series of processing shown in FIG. 3 ends. In the present embodiment, the computer 210, the VCIB 111, and the integrity control manager 115 cooperate to execute control to cause the vehicle 1 to travel by autonomous driving. The vehicle 1 can be autonomously driven in any of manned and unmanned states. It should be noted that the autonomous driving control is not limited to the control shown in FIG. 3, and other controls (known autonomous driving control) may be adopted.

Figure 4:
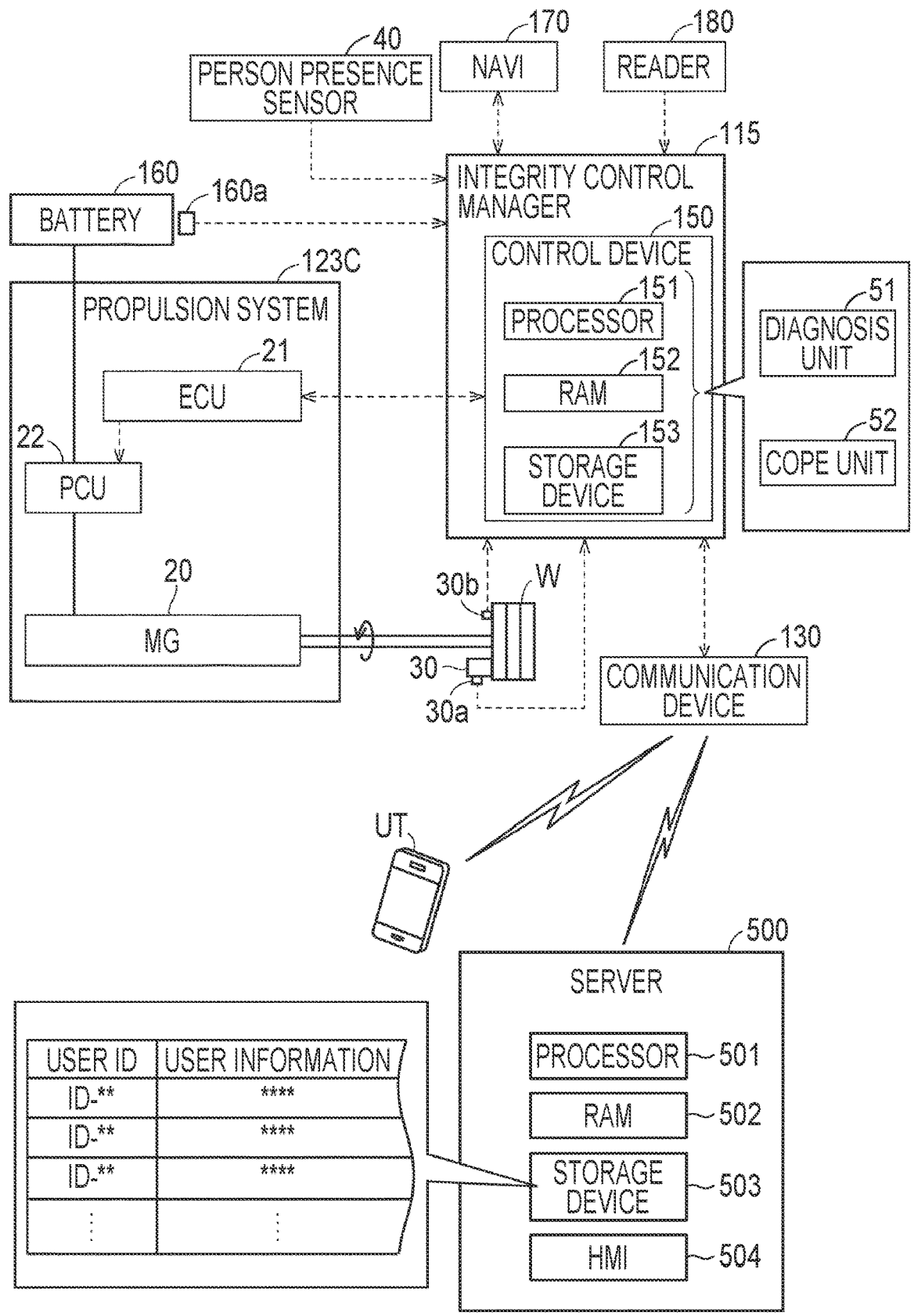
FIG. 4 is a diagram for describing details of a control device and various systems provided in the vehicle shown in FIG. 1.

FIG. 4 is a diagram for describing details of the control device 150 and various systems provided in the vehicle 1. With reference to FIG. 4 together with FIGS. 1 and 2, the vehicle 1 includes a motor generator (MG) 20, an ECU 21, a power control unit (PCU) 22, a braking device 30, a brake sensor 30*a*, an air pressure sensor 30*b*, a person presence sensor 40, a battery 160, a navigation system (hereinafter, also referred to as "NAVI") 170, a reader 180, and drive wheels W. The MG 20, the ECU 21, and the PCU 22 are provided in the propulsion system 123C. The braking device 30 and the brake sensor 30*a* are provided in the brake system 121 (FIG. 1).

The battery 160 supplies electric power to the propulsion system 123C. As the battery 160, a known vehicle power storage device (for example, a liquid secondary battery, an all-solid-state secondary battery, or an assembled battery) can be adopted. Examples of the vehicle secondary battery include a lithium ion battery and a nickel-metal hydride battery. The battery 160 is configured to allow contact charging (plug-in charging).

The battery 160 includes a monitoring module 160*a*. The monitoring module 160*a* includes various sensors that detect a state of the battery 160 (for example, a voltage, a current, and a temperature), and outputs the detection result to the integrity control manager 115. The monitoring module 160*a* may be a battery management system (BMS) further having a state-of-charge (SOC) estimation function in addition to the sensor function. The control device 150 can acquire the state of the battery 160 (for example, the temperature, the current, the voltage, and the SOC) based on the output of the monitoring module 160*a*. The SOC indicates a remaining power storage amount, and for example, a ratio of a current power storage amount to a power storage amount in a fully charged state is represented by 0% to 100%.

The propulsion system 123C generates a traveling driving force of the vehicle 1 by using the electric power stored in the battery 160. For example, the MG 20 is a three-phase alternating current motor generator. The PCU 22 includes, for example, an inverter, a converter, and a relay (hereinafter, referred to as "system main relay (SMR)"). The PCU 22 is controlled by the ECU 21. The SMR is configured to switch connection/disconnection of a power path from the battery 160 to the MG 20. The SMR is put into a closed state (connected state) when the vehicle 1 travels.

The MG 20 is driven by the PCU 22 and rotates the drive wheels W of the vehicle 1. In addition, the MG 20 executes regenerative power generation, and supply the generated electric power to the battery 160. The PCU 22 drives the MG 20 by using the electric power supplied from the battery 160. The number of traveling motors (MGs 20) provided in the vehicle 1 is optional, and may be one, two, or three or more. The traveling motor may be an in-wheel motor. Although solely one drive wheel W is schematically shown in FIG. 4, the number of the drive wheels W and a drive method in the vehicle 1 are optional. The drive method of the vehicle 1 may be any of front-wheel drive, rear-wheel drive, and four-wheel drive.

Each wheel (including the drive wheel W) provided in the vehicle 1 includes a braking device 30, a brake sensor 30*a* that detects the braking force applied to the wheel by the braking device 30, and the air pressure sensor 30*b* that detects an air pressure of the tire. The brake sensor 30*a* may be a hydraulic sensor that detects a hydraulic pressure applied to a brake pad (or a wheel cylinder). The braking force (for example, the hydraulic pressure corresponding to the braking force) for each wheel detected by the four brake sensors 30*a* are output to the integrity control manager 115. In addition, the detection result of the air pressure sensor 30*b* is also output to the integrity control manager 115.

The person presence sensor 40 is configured to detect whether or not a person is present in the vehicle 1. More specifically, the person presence sensor 40 acquires information for recognizing an in-vehicle environment of the vehicle 1 and outputs the acquired information to the integrity control manager 115. The person presence sensor 40 includes at least one of an in-vehicle camera and an infrared sensor. The person presence sensor 40 may further include at least one of a seating sensor and a seat belt sensor. The control device 150 can determine whether the vehicle 1 is in any of the manned or unmanned state based on the output of the person presence sensor 40.

The NAVI 170 includes a touch panel display, a GPS module, and a storage device (all not shown). The storage device stores map information. The touch panel display receives input from the user in the vehicle and displays a map and other information. The GPS module is configured to receive a signal from GPS satellites (not shown) (hereinafter, referred to as "GPS signal"). The NAVI 170 can specify the position of the vehicle 1 by using the GPS signal. The NAVI 170 is configured to display the position of the vehicle 1 on the map in real time. The NAVI 170 is configured to refer to the map information and execute a route search for finding the optimum route (for example, the shortest route) from the current position of the vehicle 1 to the destination. The NAVI 170 may sequentially update the map information by the OTA.

The reader 180 is configured to read predetermined identification information from the image. More specifically, the reader 180 captures the image, extracts a predetermined code from the image, and executes decoding processing. The code extracted from the image is converted into the predetermined identification information by the decoding processing described above. Moreover, the reader 180 outputs the identification information read from the image to the integrity control manager 115. It should be noted that, the reading method of the reader 180 is not limited to the above and is optional. For example, the reader 180 may be a radio frequency identification (RFID) reader.

A vehicle manager manages the vehicle 1 by using the server 500. Although solely the vehicle 1 is referred to in the present embodiment, the vehicle manager may use the server 500 to manage a number of vehicles. The vehicle manager may provide a passenger transportation service or may provide a vehicle allocation service. The server 500 may manage a service usage price for each user.

The vehicle 1 provides a service by autonomous driving in a state in which a driver is not present. That is, the vehicle manager is not present in the vehicle 1. Basically, solely a service user gets on the vehicle 1, and in a case where all the service users get off the vehicle, the vehicle 1 is in the unmanned state. For example, the vehicle 1 may travels to go around a predetermined route within a running region by autonomous driving, for example, as a fixed-route bus. In addition, the vehicle 1 may decide a route in accordance with each request and execute traveling by autonomous driving in accordance with the decided route (on-demand route). During autonomous driving of the vehicle 1, the processing shown in FIG. 3 is executed, and the control device 150 controls various systems (for example, the brake system 121, the steering system 122, the powertrain system 123, the active safety system 125, and the body system 126 shown in FIG. 2) of the vehicle 1 in response to the command from the ADK 200.

The server 500 can specify the user who is using the vehicle 1 and notify the vehicle manager of information on the user. The server 500 manages the information (user information) on each user registered in the storage device 503. Identification information (user ID) for identifying the user is assigned to each user, and the server 500 manages the user information by distinguishing the user information using the user ID. In the present embodiment, each user registered in the server 500 carries the mobile terminal UT. The user information includes, for example, vehicle maintenance skill information indicating a degree of a vehicle maintenance skill of the user, driving skill information indicating a degree of a driving skill of the user, and an address of the mobile terminal UT carried by the user. The driving skill information indicates the presence or absence of a license for manually driving the vehicle 1 and a driving skill level.

Application software for using the vehicle 1 (hereinafter, referred to as "mobile application") is installed in the mobile terminal UT. In a case where the user uses the vehicle 1, the mobile terminal UT displays the image including the identification information (user ID) of the user. Moreover, in a case where the user holds the mobile terminal UT that displays the image over the reader 180 of the vehicle 1, the user ID read by the reader 180 is transmitted from the vehicle 1 to the server 500. The server 500 specifies the user who is using the vehicle 1 based on the received user ID. The server 500 acquires the user information corresponding to the user ID from the storage device 503 and displays the acquired user information on the HMI 504 in response to a request from the vehicle manager. In addition, the server 500 transmits the information on the user who is using the vehicle 1 to the vehicle 1 in response to a request from the vehicle 1. It should be noted that, in order to suppress unauthorized usage of the vehicle 1, a gate (ticket gate) may be provided at an entrance (passenger entrance) of the vehicle 1. Moreover, the gate may be opened when the reader 180 successfully reads the user ID, and the gate may be closed again when the user passes through the gate.

The control device 150 includes a diagnosis unit 51 and a cope unit 52. In the control device 150, these units are embodied by the processor 151 and a program executed by the processor 151, for example. It should be noted that the present disclosure is not limited to this, and each of these units may be embodied by dedicated hardware (electronic circuit).

During autonomous driving of the vehicle 1, the diagnosis unit 51 determines whether or not the abnormality has occurred in the vehicle 1. The diagnosis unit 51 may determine that the abnormality has occurred in the vehicle 1, for example, in a case where a detection value of any of various sensors mounted on the vehicle 1 indicates an abnormal value. In addition, the diagnosis unit 51 may determine that the abnormality has occurred in the vehicle 1 in a case where the abnormality is detected by an abnormality detector mounted on the vehicle 1 (for example, an earth leakage detector, a disconnection detector, or a falling detector (all not shown)).

Further, the diagnosis unit 51 determines whether or not the vehicle 1 in which the abnormality has occurred can continue traveling by autonomous driving. Moreover, for the vehicle 1 in which the abnormality has occurred and continuing traveling by autonomous driving is impossible, the diagnosis unit 51 determines whether or not the vehicle 1 can be restored on the spot and whether or not the vehicle 1 can travel by manual driving. The cope unit 52 is configured to execute predetermined processing in accordance with the determination result of the diagnosis unit 51.

Figure 5:
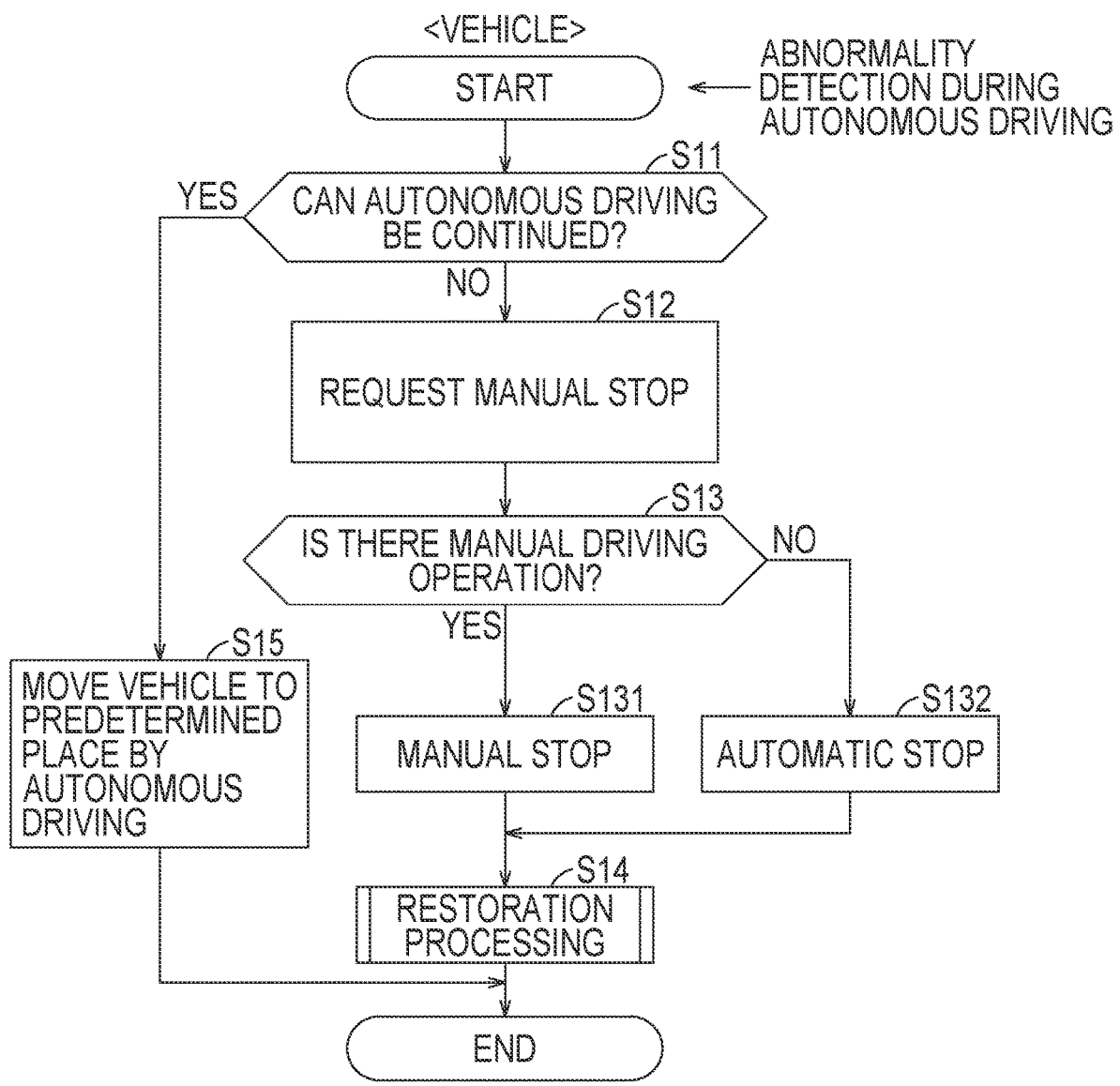
FIG. 5 is a flowchart showing a vehicle management method according to the embodiment of the present disclosure.

In a case where the abnormality is detected in the vehicle 1 during autonomous driving, the control device 150 executes a series of processing shown in FIG. 5 described below. FIG. 5 is a flowchart showing processing executed by the control device 150 in a case where the abnormality has occurred in the vehicle 1 during autonomous driving. It should be noted that determination processing (S11 and S13) in the flowchart is executed by the diagnosis unit 51, and processing (S12, S131, S132, and S15) based on the determination result is executed by the cope unit 52.

With reference to FIG. 5 together with FIGS. 1 to 4, in S11, the control device 150 determines whether or not the vehicle 1 in which the abnormality has occurred can continue traveling by autonomous driving. In a case where the vehicle 1 can continue traveling by autonomous driving (YES in S11), the vehicle 1 is moved to a predetermined place while maintaining autonomous driving in S15. The control device 150 cooperates with the ADK 200 to execute autonomous driving control (see FIG. 3). As the predetermined place, a place in which work for restoring the vehicle 1 (work for removing a cause of the abnormality from the vehicle 1) is executed is set. The predetermined place may be a store of the vehicle 1 or an automobile maintenance facility. When the vehicle 1 arrives at the predetermined place, the work for restoring the vehicle 1 is executed. As a result, the vehicle 1 returns to a normal state (state with no abnormality). In a case where the processing of S15 is executed, the series of processing shown in FIG. 5 ends.

In a case where the vehicle 1 cannot continue traveling by autonomous driving (NO in S11), in S12, the control device 150 causes a predetermined notification device (for example, at least one of the NAVI 170 and the HMI 230) to execute first notification processing of notifying the vehicle 1 that the abnormality has occurred, and second notification processing of requesting manual stop of the vehicle 1. The control device 150 may sound an alarm by the first notification processing. The predetermined notification device may execute the second notification processing by at least one of voice and display.

Subsequently, in S13, the control device 150 determines whether or not the vehicle 1 is subjected to a manual driving operation in response to the request in S12 (second notification processing). In a case where the vehicle 1 is subjected to the manual driving operation (YES in S13), in S131, the vehicle 1 is switched from the autonomous mode (autonomous driving) to the manual mode (manual driving) (override), and the user in the vehicle can stop the vehicle 1 by manual driving. In this case, the acceleration of the vehicle 1 by manual driving may be limited. In addition, in a case where a determination is made that there is the probability of collision while the vehicle 1 is traveling by manual driving, the active safety system 125 stops the vehicle 1. While the vehicle 1 is traveling by manual driving, the control device 150 requests the user in the vehicle to stop the vehicle 1 by manual driving through the predetermined notification device described above. Moreover, in a case where the vehicle 1 is stopped by manual driving, the processing proceeds to S14.

In a case where the vehicle 1 is not subjected to the manual driving operation (NO in S13), the processing proceeds to S132. For example, in a case where the vehicle 1 is in the unmanned state, a NO determination is made in S13. Even in a case where the vehicle 1 is in the manned state, when the vehicle 1 is not subjected to the manual driving operation, a NO determination is made in S13. The control device 150 may determine NO in S13 in a case where the vehicle 1 is not subjected to the manual driving operation even after a predetermined time has elapsed since the request in S12 (second notification processing).

In S132, the control device 150 stops the vehicle 1 by the brake system 121. Specifically, the control device 150 stops the vehicle 1 by outputting the braking command to the brake system 121 to increase the braking force of the vehicle 1. In a case where the vehicle 1 stops due to such automatic braking, the processing proceeds to S14.

Figure 6:
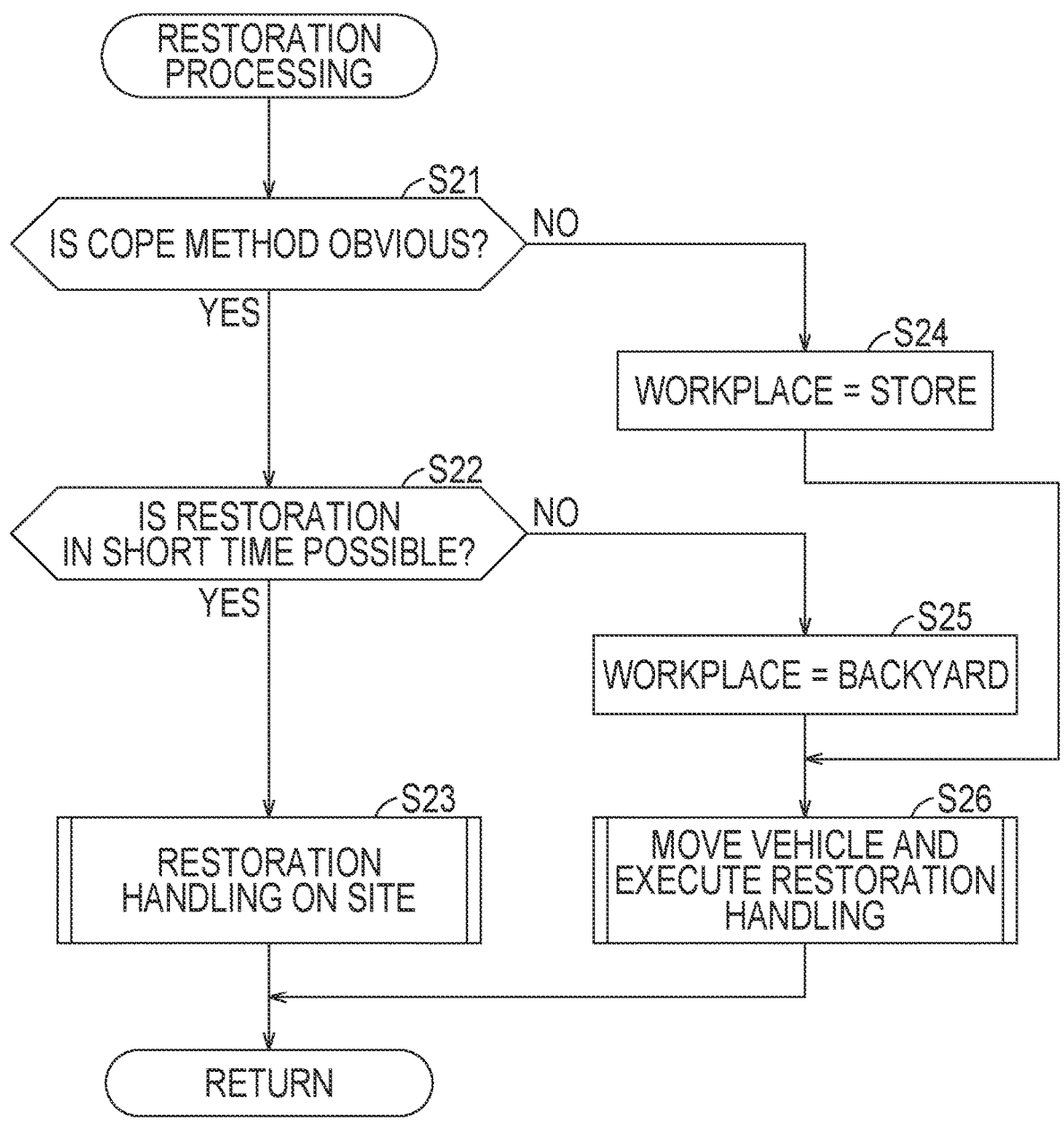
FIG. 6 is a flowchart showing details of processing of restoring a vehicle in which an abnormality has occurred in the vehicle management method shown in FIG. 5.

In S14, the processing of restoring the vehicle 1, more specifically, a series of processing shown in FIG. 6 described below is executed. FIG. 6 is a flowchart showing the details of S14. It should be noted that determination processing (S21 and S22) in the flowchart is executed by the diagnosis unit 51, and processing (S24 and S25) based on the determination result is executed by the cope unit 52.

With reference to FIG. 6 together with FIGS. 1 to 4, in S21, the control device 150 determines whether or not a cope method of the abnormality that has occurred in the vehicle 1 is obvious. The storage device 153 stores an item of a previously assumed abnormality and the cope method thereof in association with an error code. In a case where the abnormality that has occurred in the vehicle 1 corresponds to any of the items, the control device 150 determines YES in S21, and displays the error code and the cope method on the predetermined notification device (for example, at least one of the NAVI 170 and the HMI 230). The error code indicates a kind of the abnormality. Thereafter, in S22, the following diagnosis is executed.

In S22, the control device 150 determines whether or not the vehicle 1 in which the abnormality has occurred can be restored within a predetermined time. Specifically, the control device 150 requests the information (user information) on the user who is using the vehicle 1 to the server 500, and makes a determination of S22 by using the user information received from the server 500. The control device 150 may make the determination of S22 based on a difficulty level of the restoration work indicated by the error code and the vehicle maintenance skill indicated by the user information. The control device 150 may determine NO in S22 in a case where the difficulty level of the restoration work exceeds a predetermined first level. The control device 150 may determine NO in S22 in a case where the vehicle maintenance skill of the user is lower than a predetermined second level. The control device 150 may determine YES in S22 in a case where the difficulty level of the restoration work does not exceed the first level and the vehicle maintenance skill of the user reaches the second level. It should be noted that, in a case where the vehicle 1 is in the unmanned state, a NO determination is made in S22.

Figure 7:
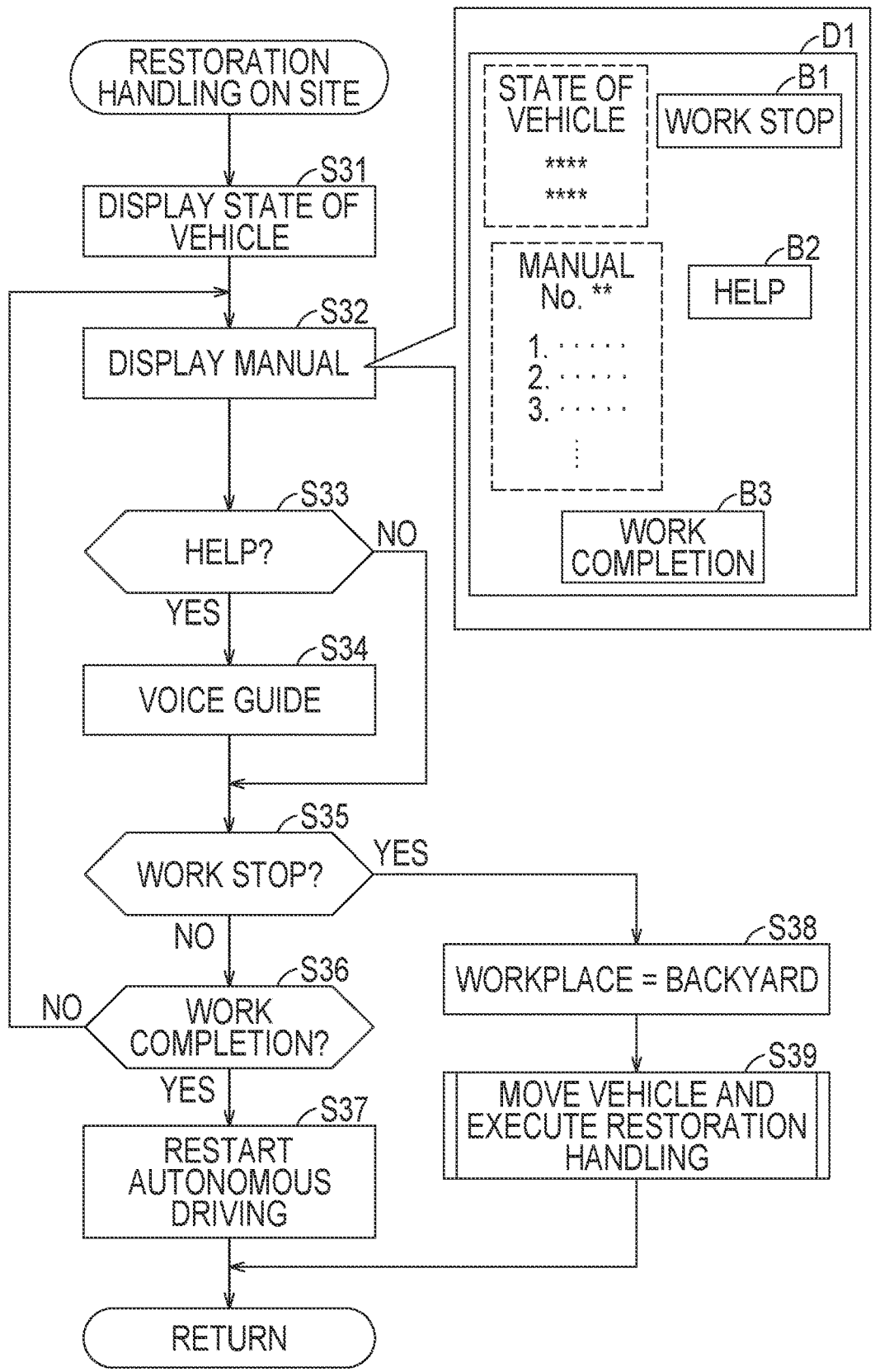
FIG. 7 is a flowchart showing details of on-spot restoration handling (restoration handling without involving movement of the vehicle) in the restoration processing shown in FIG. 6.

In a case where a determination is made that the vehicle 1 in which the abnormality has occurred can be restored within the predetermined time (YES in S22), the restoration handling of the vehicle 1 is executed on the spot in S23. A YES determination in both S21 and S22 means that the diagnosis unit 51 determines that the vehicle 1 can be restored on the spot (stop position). FIG. 7 is a flowchart showing the details of S23. It should be noted that determination processing (S33, S35, and S36) in the flowchart is executed by the diagnosis unit 51, and processing (S34, S37, and S38) based on the determination result is executed by the cope unit 52.

With reference to FIG. 7 together with FIGS. 1 to 4, in S31, the control device 150 displays the state of the vehicle 1 (for example, the error code and the abnormality item specified in S21 of FIG. 6) on the predetermined notification device. In the present embodiment, the predetermined notification device in S31 is the mobile terminal UT carried by the user who is using the vehicle 1. The mobile terminal UT may be operated in accordance with the mobile application. It should be noted that, the present disclosure is not limited to this, and a terminal mounted on the vehicle 1 (for example, the NAVI 170 or the HMI 230) may be adopted instead of or in addition to the mobile terminal UT.

In following S32, the control device 150 displays a manual showing a restoration procedure on the mobile terminal UT. The manual for each error code may be stored in the storage device 153 in advance. In addition, the control device 150 may acquire the manual from the server 500. In the present embodiment, in S32, a screen D1 shown in FIG. 7 is displayed on the mobile terminal UT. The screen D1 displays the state of the vehicle 1, the manual, a stop button B1, a help button B2, and a completion button B3.

In following S33, the control device 150 determines whether or not the help button B2 is operated by the user. In a case where the help button B2 is operated (YES in S33), the control device 150 provides a voice guide to the user in S34. For example, the voice guide by artificial intelligence (AI) may be provided. The AI for the voice guide may be stored in the storage device 153 in advance. For example, by transmitting a manual number and a step number to the AI by the user through the mobile terminal UT, the AI provides explanation (advice) regarding the corresponding work. It should be noted that, the present disclosure is not limited to this, and a call with an operator (human) may be executed instead of the voice guide by the artificial intelligence (AI).

In a case where the voice guide (S34) ends, the processing proceeds to S35. In addition, in a case where the help button B2 on the screen D1 is not operated (NO in S33), the processing proceeds to S35 without providing the voice guide (S34). In S35, the control device 150 determines whether or not a work stop condition is established. In a case where the work stop condition is not established (NO in S35), the control device 150 determines in S36 whether or not the restoration work is completed.

In the present embodiment, in a case where the user operates the stop button B1 on the screen D1, the work stop condition is established. The operation of the stop button B1 on the mobile terminal UT corresponds to input indicating the work stop. In addition, the work stop condition is also established in a case where a predetermined time has elapsed after the abnormality has occurred in the vehicle 1, before the restoration work is completed. For example, a time at which a series of processing shown in FIG. 7 is started may be regarded as a time at which the abnormality has occurred in the vehicle 1. In a case where the work stop condition is established (YES in S35), the same processing as in a case where a NO determination is made in S22 of FIG. 6 (that is, the same processing as S25 and S26 of FIG. 6 described below) is executed in S38 and S39, and then the series of processing shown in FIG. 7 ends. That is, in a case where the work stop condition is established, the diagnosis unit 51 withdraws the determination that the vehicle 1 in which the abnormality has occurred can be restored on the spot, and determines that the vehicle 1 in which the abnormality has occurred cannot be restored on the spot.

In the present embodiment, in a case where the user operates the completion button B3 on the screen D1, the control device 150 checks whether or not the vehicle 1 is in the normal state (whether the cause of the abnormality is removed from the vehicle 1). Moreover, in a case where the control device 150 determines that the vehicle 1 is in the normal state (restored), a YES determination is made in S36. On the other hand, in a case where the control device 150 determines that the vehicle 1 is not in the normal state (not restored), a NO determination is made in S36. In addition, in a case where the user does not push the completion button B3, a NO determination is made in S36. In a case where a NO determination is made in S36, the processing returns to S32.

In a case where the restoration work is completed (YES in S36), the control device 150 restarts autonomous driving of the vehicle 1 in S37, and then the series of processing shown in FIG. 7 (and thus S23 in FIG. 6) ends. As a result, S14 in FIG. 5 ends, and the series of processing shown in FIG. 5 ends.

With reference to FIG. 6 together with FIGS. 1 to 4 again, a NO determination in any of S21 or S22 means that the diagnosis unit 51 determines that the vehicle 1 cannot be restored on the spot (stop position). In this case, the restoration work of the vehicle 1 is executed after the vehicle 1 is moved to a workplace so as not to interfere with traffic. The movement method of the vehicle 1 will be described below. The workplace is decided in each of S24 and S25 described below.

In a case where the abnormality that has occurred in the vehicle 1 is not the previously assumed abnormality (does not correspond to any of the abnormality items stored in the storage device 153), the control device 150 determines NO in S21, and the processing proceeds to S24. In S24, the control device 150 sets the store (dealer) of the vehicle 1 as the workplace. In many cases, it is desirable to cope with the abnormality for which the cope method is not obvious at the store. By executing the restoration work at the store, it is easier to appropriately cope with the abnormality for which the cope method is not obvious.

In a case where a determination is made that the vehicle 1 in which the abnormality has occurred cannot be restored within the predetermined time (NO in S22), the processing proceeds to S25. In S25, the control device 150 sets a backyard as the workplace. The backyard is a place in the vicinity of the current position of the vehicle 1 that does not interfere with traffic (for example, a rest area or a parking lot).

Figure 8:
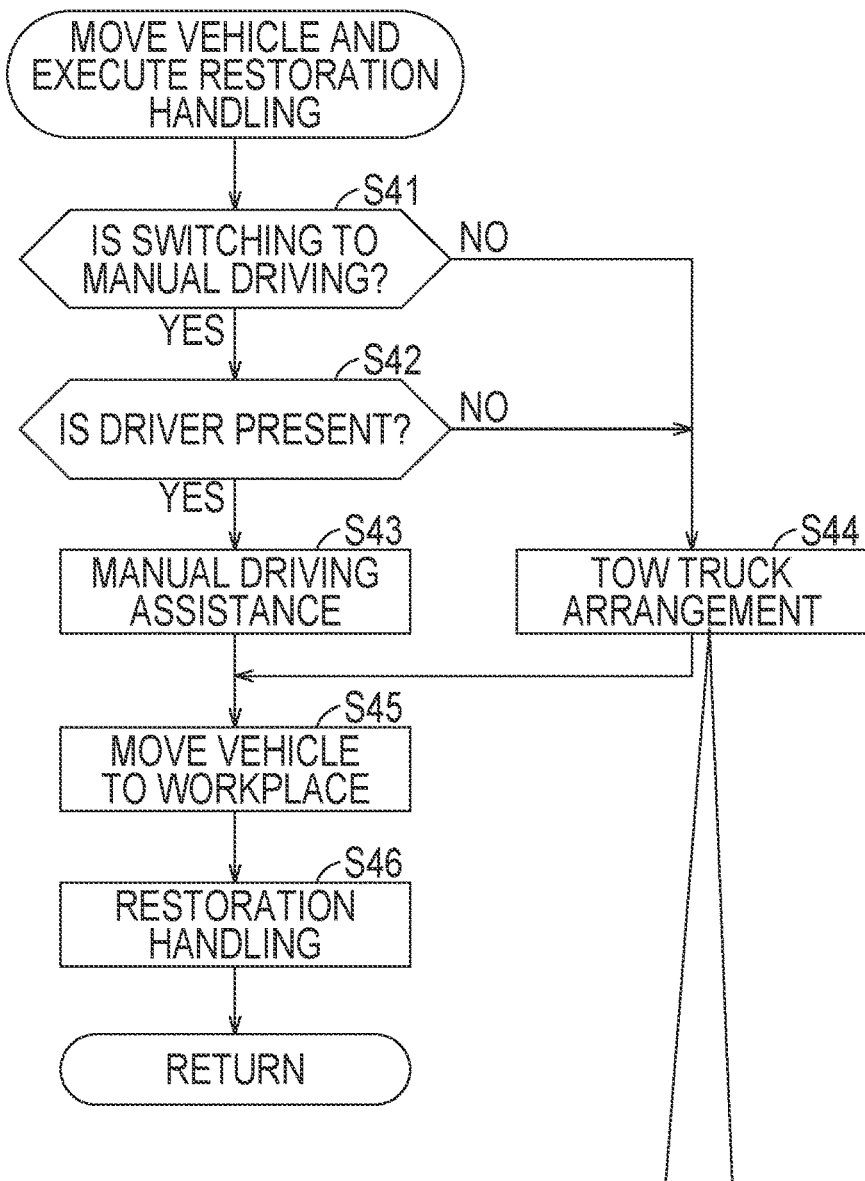
FIG. 8 is a flowchart showing details of restoration handling involving the movement of the vehicle in the restoration processing shown in FIG. 6.

In a case where the workplace is set in any of S24 and S25, the movement of the vehicle 1 and the restoration handling is executed in S26. FIG. 8 is a flowchart showing the details of S26. It should be noted that determination processing (S41 and S42) in the flowchart is executed by the diagnosis unit 51, and processing (S43 to S46) based on the determination result is executed by the cope unit 52.

With reference to FIG. 8 together with FIGS. 1 to 4, in S41, the control device 150 determines whether or not the vehicle 1 can be switched to manual driving. The control device 150 may determine whether or not the vehicle 1 can be switched to manual driving based on whether or not the abnormality that has occurred in the vehicle 1 does not hinder manual driving. Examples of the abnormality that does not hinder manual driving include an abnormality related to the autonomous driving control and a puncture of a run flat tire. Examples of the abnormality that hinders manual driving is a decrease in a brake hydraulic pressure.

In following S42, the control device 150 determines whether or not a person who can manually drive the vehicle 1 is in the vehicle 1. Specifically, the control device 150 uses the output of the person presence sensor 40 to determine whether or not the person is in the vehicle 1. In a case where the vehicle 1 is in the unmanned state, a NO determination is made in S42. In a case where the vehicle 1 is in the manned state, the control device 150 requests the information (user information) on the user who is using the vehicle 1 to the server 500. Moreover, the control device 150 uses the user information received from the server 500 to determine whether or not the person in the vehicle can manually drive the vehicle 1. In the present embodiment, in a case where the person in the vehicle does not have the license to manually drive the vehicle 1, a NO determination is made in S42. In addition, in a case where the driving skill level of the person in the vehicle is lower than a predetermined level (for example, in a case where the person in the vehicle is an inexperienced driver), a NO determination is made also in S42. The control device 150 may determine YES in S42 in a case where the driving skill level of the person in the vehicle reaches the predetermined level. A YES determination in both S41 and S42 means that the diagnosis unit 51 determines that the vehicle 1 can travel by manual driving.

In a case where a YES determination is made in both S41 and S42, the control device 150 puts the vehicle 1 into a state in which the vehicle 1 can be controlled by manual driving and executes the driving assistance processing in S43. Specifically, the control device 150 may display the destination (workplace set in any of S24 and S25 of FIGS. 6, and S38 of FIG. 7) to which the vehicle 1 travels by manual driving on the NAVI 170, together with a periphery map. In addition, the advanced driving assistance system (ADAS) available in the vehicle 1 may be operated.

In S45 after the processing of S43 is executed, the vehicle 1 is moved toward the workplace (destination) by manual driving. The control device 150 executes traveling control of the vehicle 1 in accordance with the driving operation of the user in S45. The user may execute manual driving while receiving the driving assistance. Moreover, when the vehicle 1 arrives at the workplace, the control device 150 executes the processing for the restoration handling in S46. In a case where the workplace is the backyard, the control device 150 requests the store (dealer) of the vehicle 1 to dispatch a worker. The dispatch request may be executed before the vehicle 1 arrives at the workplace (backyard). After the vehicle 1 arrives at the workplace, the control device 150 may display the state of the vehicle 1 on the predetermined notification device (for example, at least one of the NAVI 170 and the HMI 230) in S46.

A NO determination in any of S41 and S42 means that the diagnosis unit 51 determines that the vehicle 1 cannot travel by manual driving. In a case where a NO determination is made in any of S41 and S42, the control device 150 executes a tow truck arrangement for towing the vehicle 1 in S44. Specifically, the control device 150 transmits a signal for requesting towing (hereinafter, also referred to as "tow request signal") to the terminal of a tow service company. The tow request signal includes the current position (stop position) of the vehicle 1 and the destination (in the present embodiment, the workplace set in any of S24 and S25 of FIGS. 6, and S38 of FIG. 7). In a case where the request for towing is received, the tow service company sends a tow truck 300 shown in FIG. 8, for example, to the vehicle 1. Moreover, the vehicle 1 is towed by the tow truck 300 and carried to the workplace (destination).

In S45 after the processing of S44 is executed, the tow truck 300 tows the vehicle 1 toward the workplace (destination). In S45, the control device 150 maintains the vehicle 1 in a towable state (towed mode). Moreover, when the vehicle 1 arrives at the workplace, the control device 150 executes the processing for the restoration handling in S46. The processing of S46 is the same as in a case where the vehicle 1 is moved by manual driving.

In a case where the processing of S46 is executed, a series of processing shown in FIG. 8 (and thus S26 of FIG. 6 or S39 of FIG. 7) is ends. As a result, S14 in FIG. 5 ends, and the series of processing shown in FIG. 5 ends.

As described above, the vehicle management method according to the present embodiment includes the processing shown in FIGS. 5 to 8. In the present embodiment, the integrity control manager 115 (control device 150) includes an example of a "computer" according to the present disclosure.

In S11 of FIG. 5, the control device 150 determines whether or not the abnormality has occurred in the vehicle 1 during autonomous driving, the abnormality disabling the vehicle 1 from continuing traveling by autonomous driving. In S21 and S22 of FIG. 6, the control device 150 determines whether or not the vehicle 1 in which the abnormality has occurred can be restored on the spot. In S41 and S42 of FIG. 8, the control device 150 determines whether or not the vehicle 1 in which the abnormality has occurred can travel by manual driving. Moreover, in a case where the vehicle 1 in which the abnormality has occurred cannot be restored on the spot and the vehicle 1 in which the abnormality has occurred cannot travel by manual driving (NO in any of S21 and S22 of FIG. 6, and NO in any of S41 and S42 of FIG. 8), the control device 150 executes the tow truck arrangement for towing the vehicle 1 in S44 of FIG. 8. With the vehicle management method described above, in a case in which the abnormality has occurred in the vehicle during autonomous driving, it is possible to take measures with respect to the vehicle at an early stage and in an appropriate manner.

The functions of the control device 150 according to the embodiment described above (in particular, the functions of the diagnosis unit 51 and the cope unit 52 shown in FIG. 4) may be implemented in the computer 210 of the ADK 200. For example, the computer 210 may execute the processing shown in FIG. 6 instead of the control device 150. In such a form, the processing shown in each of FIGS. 7 and 8 included in the processing shown in FIG. 6 is also executed by the computer 210. The computer 210 may instruct the control device 150 on the needed processing. The presence of the vehicle control interface in the base vehicle 100 facilitates attachment and detachment of the ADK 200. By implementing the functions of the diagnosis unit 51 and the cope unit 52 in the computer 210, it is easier to apply these functions to the vehicle. In such a vehicle, the computer 210 of the ADK 200 corresponds to an example of a "computer" according to the present disclosure.

The functions of the control device 150 according to the embodiment described above (in particular, the functions of the diagnosis unit 51 and the cope unit 52 shown in FIG. 4) may be implemented in the mobile terminal UT. For example, the diagnosis unit 51 and the cope unit 52 may be embodied by the mobile application.

The control device 150 of the vehicle 1 may execute the processing shown in FIG. 9 instead of the processing shown in FIG. 5. FIG. 9 is a flowchart showing a first modification example of the processing shown in FIG. 5. The processing shown in FIG. 9 is the same as the processing shown in FIG. 5 except that S14A is adopted instead of S14 (FIG. 5). With reference to FIG. 9, in S14A, the control device 150 requests the processing for restoring the vehicle 1 to the mobile terminal UT carried by the user who is using the vehicle 1. The mobile terminal UT executes the processing shown in FIG. 6 in response to the request from the vehicle 1 (control device 150). The mobile terminal UT acquires the information from each of the vehicle 1 and the server 500 or requests the vehicle control to the vehicle 1, as needed. In the first modification example described above, the mobile terminal UT includes an example of a "computer" according to the present disclosure.

The functions of the control device 150 according to the embodiment described above (in particular, the functions of the diagnosis unit 51 and the cope unit 52 shown in FIG. 4) may be implemented in an on-premises server (server 500). In addition, the functions of the control device 150 may be implemented on the cloud by cloud computing.

The control device 150 of the vehicle 1 may execute the processing shown in FIG. 10 instead of the processing shown in FIG. 5. FIG. 10 is a flowchart showing a second modification example of the processing shown in FIG. 5. The processing shown in FIG. 10 is the same as the processing shown in FIG. 5 except that S14B is adopted instead of S14 (FIG. 5). With reference to FIG. 10, in S14B, the control device 150 requests the processing for restoring the vehicle 1 to the server 500. The server 500 executes the processing shown in FIG. 6 in response to the request from the vehicle 1 (control device 150). The server 500 acquires the information from each of the vehicle 1 and the mobile terminal UT or requests the vehicle control to the vehicle 1, as needed. In the second modification example described above, the server 500 includes an example of a "computer" according to the present disclosure.

The processing shown in each of FIGS. 5 to 10 can be changed as appropriate. For example, in a case where a NO determination is made in S11 of FIG. 5, FIG. 9, or FIG. 10, automatic stop (S132) may be executed without executing the manual stop request.

The configuration of the vehicle is not limited to the configuration described in the embodiment described above (see FIGS. 1, 2, and 4). The base vehicle may have an autonomous driving function without retrofitting. The vehicle may include a solar panel or may have a flight function. The vehicle may include a charger for traveling charging or contactless charging. The vehicle is not limited to a passenger car, and may be a bus or a truck. The vehicle may be a multipurpose vehicle customized in accordance with the user's purpose of use. The vehicle may be a mobile store vehicle or an agricultural machine. The vehicle may be a one-passenger small BEV (for example, a Micro Pallet).

The embodiment and each modification example described above may be carried out in any combination.

The embodiment disclosed this time should be considered to be exemplary examples and not to be restrictive in all respects. The technical scope of the present disclosure is shown by the scope of claims rather than the description of the embodiment described above, and is intended to include all changes within the meaning and scope equivalent to the scope of claims.

What is claimed is:

1. A computer comprising:
 a processor configured to:
  for a vehicle in which an abnormality has occurred and continuing traveling by autonomous driving is impossible, determine whether or not the vehicle in which the abnormality has occurred is able to be restored on a spot and whether or not the vehicle in which the abnormality has occurred is able to travel by manual driving;
  execute predetermined processing in accordance with a determination result of whether or not the vehicle in which the abnormality has occurred is able to be restored on a spot and is able to travel by manual driving;
  determine whether or not a cope method of the abnormality is a previously assumed abnormality and the cope method in association with the previously assumed abnormality was successful and whether or not the vehicle in which the abnormality has occurred is able to be restored within a predetermined time;
  determine that the vehicle in which the abnormality has occurred is able to be restored on the spot in a case where the cope method of the abnormality is the previously assumed abnormality and the cope method in association with the previously assumed abnormality was successful and the vehicle in which the abnormality has occurred is able to be restored within the predetermined time; and
 the vehicle in which the abnormality has occurred further includes:
  an autonomous driving kit, and
  a vehicle control interface configured to mediate exchange of signals between the processor and the autonomous driving kit;
  the autonomous driving kit is configured to transmit a command for autonomous driving to the processor via the vehicle control interface;
  the processor is further configured to control the vehicle in which the abnormality has occurred in accordance with the command from the autonomous driving kit; and
  the processor is further configured to transmit a signal indicating a state of the vehicle in which the abnormality has occurred to the autonomous driving kit via the vehicle control interface.

2. The computer according to claim 1, wherein the processor is further configured to:
 execute a tow truck arrangement for towing the vehicle in which the abnormality has occurred in a case where the determination is that the vehicle in which the abnormality has occurred is unable to be restored on the spot and the vehicle in which the abnormality has occurred is unable to travel by manual driving; and not to execute the tow truck arrangement in each of a case where the determination is that the vehicle in which the abnormality has occurred is able to be restored on the spot and a case where the determination is that the vehicle in which the abnormality has occurred is able to travel by manual driving.

3. The computer according to claim 1, wherein the processor is further configured to display a manual indicating a restoration procedure on at least one of a terminal mounted on the vehicle in which the abnormality has occurred and a terminal of a user who is using the vehicle in which the abnormality has occurred in a case where the determination is that the vehicle is able to be restored on the spot.

4. The computer according to claim 3, wherein the processor is further configured to withdraw the determination that the vehicle in which the abnormality has occurred is able to be restored on the spot and determine that the vehicle in which the abnormality has occurred is unable to be restored on the spot in a case where the user makes input indicating work stop to the terminal on which the manual is displayed.

5. The computer according to claim 1, wherein the processor is further is configured to determine whether or not the vehicle in which the abnormality has occurred is able to be restored within the predetermined time by using user information of a user who is using the vehicle in which the abnormality has occurred.

6. The computer according to claim 1, wherein the processor is further configured to:
   determine whether or not the vehicle in which the abnormality has occurred is able to be switched to manual driving and whether or not a person who is able to manually drive the vehicle in which the abnormality has occurred is in the vehicle in which the abnormality has occurred; and
   determine that the vehicle in which the abnormality has occurred is able to travel by manual driving in a case where the vehicle in which the abnormality has occurred is able to be switched to manual driving and the person who is able to manually drive the vehicle in which the abnormality has occurred is in the vehicle in which the abnormality has occurred.

7. The computer according to claim 6, wherein the processor is further configured to determine whether or not the person who is able to manually drive the vehicle in which the abnormality has occurred is in the vehicle in which the abnormality has occurred by using output of a sensor configured to detect whether or not a person is present in the vehicle in which the abnormality has occurred and user information of a user who is using the vehicle in which the abnormality has occurred.

8. The computer according to claim 1, wherein the processor is further configured to execute driving assistance processing in a case where the vehicle in which the abnormality has occurred in which the abnormality has occurred and continuing traveling by autonomous driving is impossible is able to travel by manual driving.

9. The computer according to claim 1, wherein:
   the processor or the autonomous driving kit includes the computer.

10. A server comprising the computer according to claim 1.

11. A mobile terminal comprising the computer according to claim 1.

12. A vehicle management method comprising:
determining whether or not an abnormality has occurred in a vehicle during autonomous driving via a computer, the abnormality disabling the vehicle from continuing traveling by autonomous driving, the vehicle having an autonomous driving kit, and a vehicle control interface configured to mediate exchange of signals between the computer and the autonomous driving kit, the autonomous driving kit is configured to transmit a command for autonomous driving to the computer via the vehicle control interface, the computer is further configured to control the vehicle in accordance with the command from the autonomous driving kit, and is further configured to transmit a signal indicating a state of the vehicle to the autonomous driving kit via the vehicle control interface;

determining whether or not a cope method of the abnormality is a previously assumed abnormality and the cope method in association with the previously assumed abnormality was successful and whether or not the vehicle is able to be restored within a predetermined time via the computer;

determining whether or not the vehicle in which the abnormality has occurred is able to be restored on a spot via the computer in a case where the cope method of the abnormality is the previously assumed abnormality and the cope method in association with the abnormality was successful and the vehicle in which the abnormality has occurred is able to be restored within the predetermined time;

determining whether or not the vehicle in which the abnormality has occurred is able to travel by manual driving via the computer; and executing a tow truck arrangement for towing the vehicle via the computer in a case where the vehicle in which the abnormality has occurred is unable to be restored on the spot and the vehicle in which the abnormality has occurred is unable to travel by manual driving.

13. A computer comprising:
a processor configured to:
   for a vehicle in which an abnormality has occurred and continuing traveling by autonomous driving is impossible, determine whether or not the vehicle in which the abnormality has occurred is able to be restored on a spot and whether or not the vehicle in which the abnormality has occurred is able to travel by manual driving;
   execute predetermined processing in accordance with a determination result of whether or not the vehicle in which the abnormality has occurred is able to be restored on a spot and is able to travel by manual driving;
   determine whether or not the vehicle in which the abnormality has occurred is able to be switched to manual driving and whether or not a person who is able to manually drive the vehicle in which the abnormality has occurred is in the vehicle in which the abnormality has occurred;
   determine that the vehicle in which the abnormality has occurred is able to travel by manual driving in a case where the vehicle in which the abnormality has occurred is able to be switched to manual driving and the person who is able to manually drive the vehicle in which the abnormality has occurred is in the vehicle in which the abnormality has occurred; and the vehicle in which the abnormality has occurred further includes:
- an autonomous driving kit, and
- a vehicle control interface configured to mediate exchange of signals between the processor and the autonomous driving kit;

the autonomous driving kit is configured to transmit a command for autonomous driving to the processor via the vehicle control interface;

the processor is further configured to control the vehicle in which the abnormality has occurred in accordance with the command from the autonomous driving kit; and the processor is further configured to transmit a signal indicating a state of the vehicle in which the abnormality has occurred to the autonomous driving kit via the vehicle control interface.

14. The computer according to claim 13, wherein the processor is further configured to:
- execute a tow truck arrangement for towing the vehicle in which the abnormality has occurred in a case where the determination is that the vehicle in which the abnormality has occurred is unable to be restored on the spot and the vehicle in which the abnormality has occurred is unable to travel by manual driving; and
- not to execute the tow truck arrangement in each of a case where the determination is that the vehicle in which the abnormality has occurred is able to be restored on the spot and a case where the determination is that the vehicle in which the abnormality has occurred is able to travel by manual driving.

15. The computer according to claim 13, wherein the processor is further configured to display a manual indicating a restoration procedure on at least one of a terminal mounted on the vehicle in which the abnormality has occurred and a terminal of a user who is using the vehicle in which the abnormality has occurred in a case where the determination is that the vehicle is able to be restored on the spot.

16. The computer according to claim 15, wherein the processor is further configured to withdraw the determination that the vehicle in which the abnormality has occurred is able to be restored on the spot and determine that the vehicle in which the abnormality has occurred is unable to be restored on the spot in a case where the user makes input indicating work stop to the terminal on which the manual is displayed.

17. The computer according to claim 16, wherein the processor is further configured to determine whether or not the person who is able to manually drive the vehicle in which the abnormality has occurred is in the vehicle in which the abnormality has occurred by using output of a sensor configured to detect whether or not a person is present in the vehicle in which the abnormality has occurred and user information of a user who is using the vehicle in which the abnormality has occurred.

18. The computer according to claim 13, wherein the processor is further configured to execute driving assistance processing in a case where the vehicle in which the abnormality has occurred in which the abnormality has occurred and continuing traveling by autonomous driving is impossible is able to travel by manual driving.

19. The computer according to claim 13, wherein the processor or the autonomous driving kit includes the computer.

* * * * *